United States Patent
Baek

(10) Patent No.: US 11,843,998 B2
(45) Date of Patent: Dec. 12, 2023

(54) METHOD AND APPARATUS FOR SUPPORTING MULTICAST SERVICE IN A WIRELESS COMMUNICATION

(71) Applicant: Samsung Electronics Co., Ltd., Suwon-si (KR)

(72) Inventor: Youngkyo Baek, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 43 days.

(21) Appl. No.: 17/667,768

(22) Filed: Feb. 9, 2022

(65) Prior Publication Data

US 2022/0272498 A1     Aug. 25, 2022

(30) Foreign Application Priority Data

Feb. 9, 2021 (KR) .......................... 10-2021-0018670

(51) Int. Cl.
    *H04H 20/71*        (2008.01)
    *H04W 4/08*         (2009.01)
    *H04W 76/40*       (2018.01)

(52) U.S. Cl.
    CPC ............. *H04W 4/08* (2013.01); *H04W 76/40* (2018.02)

(58) Field of Classification Search
    CPC ....... H04W 4/08; H04W 76/40; H04W 76/11; H04W 4/06; H04W 80/10; H04L 12/1863; H04L 12/189; H04L 67/148
    USPC ........................................................ 370/312
See application file for complete search history.

(56) References Cited

U.S. PATENT DOCUMENTS

| | | | |
|---|---|---|---|
| 2019/0158985 A1 | 5/2019 | Dao et al. | |
| 2021/0281981 A1 | 9/2021 | Li et al. | |
| 2022/0264378 A1* | 8/2022 | Zong ................. | H04W 36/0058 |
| 2022/0264527 A1* | 8/2022 | Zong .................... | H04W 72/30 |

(Continued)

FOREIGN PATENT DOCUMENTS

| | | |
|---|---|---|
| CN | 111556540 A | 8/2020 |
| CN | 111918342 A | 11/2020 |
| WO | 2020/108022 A1 | 6/2020 |

OTHER PUBLICATIONS

3GPP TR 23.757 V1.2.0; 3rd Generation Partnership Project; Technical Specification Group Services and System Aspects; Study on architectural enhancements for 5G multicast-broadcast services. (Release 17), Nov. 28, 2020.

(Continued)

*Primary Examiner* — Chuong T Ho
(74) *Attorney, Agent, or Firm* — Jefferson IP Law, LLP

(57) ABSTRACT

A method performed by a first entity in a wireless communication system is provided. The method includes receiving a first request message for receiving a multicast service from a second entity, detecting information about a multicast session identifier (ID) from the first request message, requesting information about a fourth entity corresponding to the multicast session ID from a third entity when the first entity does not correspond to the information about the multicast session ID, receiving the information about the fourth entity corresponding to the multicast session ID, identifying the fourth entity based on the information about the fourth entity, transmitting a multicast session join request message to the fourth entity, and receiving a message accepting multicast session join from the fourth entity.

12 Claims, 14 Drawing Sheets

(56) References Cited

U.S. PATENT DOCUMENTS

2022/0272498 A1* 8/2022 Baek .................. H04L 12/189
2023/0096763 A1* 3/2023 Vesely ................ H04W 76/11
                                                  370/312

OTHER PUBLICATIONS

International Search Report and International Written Opinion dated May 9, 2022, issued in an International Application No. PCT/KR2022/001986.

* cited by examiner

METHOD AND APPARATUS FOR SUPPORTING MULTICAST SERVICE IN A WIRELESS COMMUNICATION

CROSS-REFERENCE TO RELATED APPLICATION(S)

This application is based on and claims priority under 35 U.S.C. § 119(a) of a Korean patent application number 10-2021-0018670, filed on Feb. 9, 2021, in the Korean Intellectual Property Office, the disclosure of which is incorporated by reference herein in its entirety.

BACKGROUND

1. Field

The disclosure relates to a method and apparatus for supporting a multicast service in a wireless communication system.

2. Description of Related Art

5th Generation (5G) mobile communication technologies define broad frequency bands such that high transmission rates and new services are possible, and can be implemented not only in "Sub 6 GHz" bands such as 3.5 GHz, but also in "Above 6 GHz" bands referred to as millimeter (mm) Wave including 28 GHz and 39 GHz. In addition, it has been considered to implement 6th Generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR User Equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step Random-Access Channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Accordingly, various attempts are being made to apply the 5G communication system to IoT. For example, 5G communication technologies such as sensor networks, Machine-to-Machine (M2M), and MTC are implemented by techniques including beamforming, MIMO, and array antenna. Application of a cloud RAN as the big data processing technology described above may be considered to be an example of convergence between the 5G technology and the IoT technology.

Along with the recent development of communication systems, various studies have been conducted to provide different network slicings (or network slices) in a 5G-based wireless communication system.

To transmit the same data to multiple user equipments (UEs) in a mobile network, a data service needs to be multicast/broadcast. For example, there is a need for a method of multicasting/broadcasting data to provide a television (TV)/audio service, a vehicle-to-everything (V2X) service, or a massive consumer Internet of things (CIoT) service to multiple UEs in a specific area.

Further, the multicast/broadcast service is provided by multicast/broadcast service (MBS) technology in a 5G system (5GS) network. In this context, there exists a need for a method of smoothly providing a multicast/broadcast service, even when a UE moves out of the service area of a session management function (SMF) that manages an existing protocol data unit (PDU) session or a method of continuously supporting a multicast/broadcast service provided by a home network in a roaming network, even when a UE roams.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for supporting a multicast service in a wireless communication system.

Another aspect of the disclosure is to provide a method and an apparatus for smoothly providing multicast/broadcast in an environment in which a user equipment (UE) roams in a wireless communication system.

Additional aspects will be set forth in part in the description which follows and, in part, will be apparent from the description, or may be learned by practice of the presented embodiments.

In accordance with an aspect of the disclosure, a method performed by a first entity in a wireless communication system is provided. The method includes receiving a first request message for receiving a multicast service from a second entity, detecting information about a multicast session identifier (ID) from the first request message, requesting information about a fourth entity corresponding to the multicast session identification (ID) from a third entity when the first entity does not correspond to the information about the multicast session ID, receiving the information about the fourth entity corresponding to the multicast session ID, identifying the fourth entity based on the information about the fourth entity, transmitting a multicast session join request message to the fourth entity, and receiving a message accepting multicast session join from the fourth entity.

In accordance with an aspect of the disclosure, a first entity in a wireless communication system is provided. The first entity includes a transceiver, and a processor coupled with the transceiver configured to receive a first request message for receiving a multicast service from a second entity, detect information about a multicast session identifier (ID) from the first request message, in case that the first entity does not correspond to the information about the multicast session ID, request information about a fourth entity corresponding to the multicast session ID from a third entity, receive the information about the fourth entity corresponding to the multicast session ID, identify the fourth entity based on the information about the fourth entity transmit a multicast session join request message to the fourth entity, and receive a message accepting multicast session join from the fourth entity.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
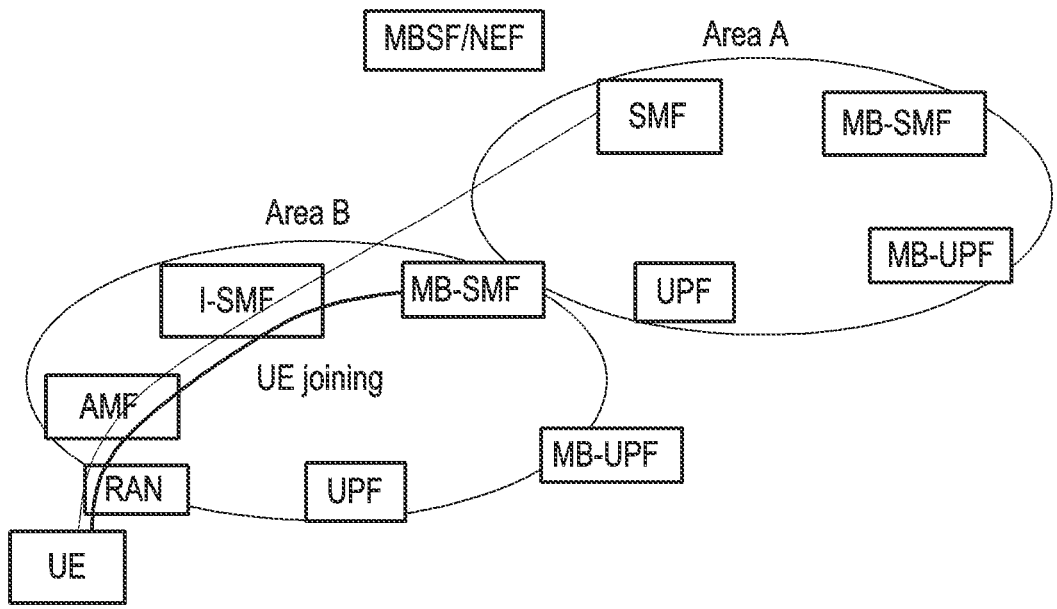
FIG. 1A is a simplified diagram illustrating a scenario in which a user equipment (UE) located outside the service area of a serving session management function (SMF) joins a multicast service according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components shown in the drawings are exaggerated, omitted, or schematically illustrated, and the drawn size of each component does not exactly reflect its real size. In each drawing, the same reference numerals are assigned to the same or corresponding components.

The advantages and features of the disclosure, and a method of achieving them will become apparent from reference to embodiments described below in detail in conjunction with the attached drawings. However, the disclosure may be implemented in various manners, not limited to the embodiments set forth herein. Rather, these embodiments are provided such that the disclosure is complete and thorough and its scope is fully conveyed to those skilled in the art, and the disclosure is only defined by the appended claims. The same reference numerals denote the same components throughout the specification.

It will be understood that each block of the flowchart illustrations and combinations of blocks in the flowchart illustrations may be implemented by computer program instructions. These computer program instructions may be loaded on a processor of a general purpose computer, special purpose computer, or other programmable data processing equipment, such that the instructions, which are executed via the processor of the computer or other programmable data processing equipment, create means for implementing the functions specified in the flowchart and/or block diagram block(s). These computer program instructions may also be stored in a computer-usable or computer-readable memory that may direct the computer or other programmable data processing equipment to function in a particular manner, such that the instructions stored in the computer-usable or computer-readable memory produce an article of manufacture including instruction means which implement the function specified in the flowchart and/or block diagram block(s). The computer program instructions may also be loaded onto the computer or other programmable data processing equipment to cause a series of operations to be performed on the computer or other programmable data processing equipment to produce a computer implemented process such that the instructions which are executed on the computer or other programmable equipment provide operations for implementing the functions/acts specified in the flowchart and/or block diagram block(s).

Furthermore, the respective block diagrams may illustrate parts of modules, segments, or codes including one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The term "unit" as used herein means, but is not limited to, a software or hardware component, such as a field programmable gate array (FPGA) or application specific integrated circuit (ASIC), which performs certain tasks. A unit may advantageously be configured to reside on an addressable storage medium and configured to be executed on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or further separated into additional components and "units". In addition, the components and "units" may be implemented such that they are executed on one or more central processing units (CPUs) in a device or a secure multimedia card.

Further, terminology identifying access nodes, terminology signifying messages, terminology signifying interfaces between network entities, terminology signifying various types of information, and so on as used in the following description are given for convenience of description. Accordingly, the disclosure is not limited to the terms described below, and the terms may be replaced by other equivalent terms in technical meanings.

In embodiments of the disclosure, a base station (BS), which is an entity that allocates resources to a user equipment (UE), may be at least one of a next generation Node B (gNode B or gNB), an evolved Node B (eNode B or eNB), a Node B, a radio access unit, a base station controller (BSC), or a network node. In addition, the BS may be a network entity including at least one of an integrated access and backhaul (IAB)-donor that is a gNB providing network access to UE(s) through a network of backhaul and access links or an IAB-node that is a radio access network (RAN) node supporting NR access link(s) to UE(s) and supporting NR backhaul links to the IAB-donor or another IAB-node in a new radio (NR) system. A UE may be wirelessly connected to an IAB-donor through an IAB-node and transmit and receive data to and from the IAB-donor connected to at least one IAB-node via a backhaul link.

Further, the UE may include a terminal, a mobile station (MS), a cellular phone, a smart phone, a computer, or various devices capable of executing a communication function. In the disclosure, a downlink (DL) is a wireless transmission path of a signal transmitted from a BS to a UE, and an uplink (UL) is a wireless transmission path of a signal transmitted from a UE to a BS. While a long term evolution (LTE) or LTE-advanced (LTE-A) system may be described below as an example, embodiments of the disclosure are applicable to other communication systems having a similar technical background or channel structure. For example, the communication systems may include 5th generation (5G) new radio (5G NR) developed after LTE-A, and 5G may be a concept encompassing legacy LTE, legacy LTE-A, and other similar services in the following description. Further, the disclosure is also applicable to other communication systems through some modifications without greatly departing from the scope of the disclosure as judged by those skilled in the art.

Terminology signifying signals, terminology signifying channels, terminology signifying control information, terminology signifying network entities, and terminology signifying components of a device as used in the following description are given for convenience of description. Further, terminology identifying nodes, terminology signifying messages, terminology signifying interfaces between network entities, terminology signifying various types of information, and so on as used in the following description are given for convenience of description. Accordingly, the disclosure is not limited to the terms described below, and the terms may be replaced by other equivalent terms in technical meanings.

For convenience of description, the disclosure uses terms and names defined in communication standards for $4^{th}$ generation (4G) and 5G systems (e.g., TS 23.401, TS 23.501, TS 23.502, and TS 23.503 of the 3rd Generation Partnership Project (3GPP)). However, the disclosure is not limited by the above terms and names. Accordingly, the terms or names defined in the disclosure may be equally applied to systems conforming to other standards.

In the disclosure, the terms, 5G multicast/broadcast services (5MBS) system, 5G multicast system, and 5G MBS system are used interchangeably with each other, in the same meaning of a multicast and broadcast system of a 5G system.

Further, while the disclosure is described in the context of a multicast service, it is apparent to those skilled in the art that the disclosure may also be applied to a broadcast service.

FIG. 1A is a simplified diagram illustrating a scenario in which a UE located outside the service area of a serving session management function (SMF) joins a multicast service according to an embodiment of the disclosure.

The 5G standard (TS 23.502) defines service operations related to a protocol data unit (PDU) session among network function (NF) services provided by an SMF that manages a session in Table 1 below.

TABLE 1

Table 5.2.8.1-1: NF Services provided by the SMF

| Service Name | Service Operations | Operation Semantics | Example Consumer(s) |
| --- | --- | --- | --- |
| Nsmf_PDUSession | Create | Request/Response | V-SMF/I-SMF |
| | Update | Request/Response | V-SMF/I-SMF, H-SMF |
| | Release | Request/Response | V-SMF/I-SMF |
| | CreateSMContext | Request/Response | AMF |
| | UpdateSMContext | Request/Response | AMF |
| | ReleaseSMContext | Request/Response | AMF |
| | SMContextStatusNotify | Subscribe/Notify | AMF |
| | StatusNotify | Subscribe/Notify | V-SMF/I-SMF |

TABLE 1-continued

Table 5.2.8.1-1: NF Services provided by the SMF

| Service Name | Service Operations | Operation Semantics | Example Consumer(s) |
| --- | --- | --- | --- |
| | ContextRequest | Request/Response | AMF, I-SMF, SMF |
| | ContextPush | Request/Response | SMF |
| | SendMOData | Request/Response | AMF |
| | TransferMOData | Request/Response | V-SMF/I-SMF |
| | TransferMTData | Request/Response | SMF, H-SMF |

The 5G system structure of FIG. 1A supports service-based interfaces, and a service-based interface related to an SMF is defined as 'Nsmf' as illustrated in Table 1 above. In Table 1, 'Nsmf_PDUSession' means a service operating in a PDU session, and the service includes creation/deletion/modification of the PDU session. These operations may be performed by transmitting and receiving PDU session request/response messages between an access and mobility management function (AMF) and an SMF. As in the example of Table 1, to support a PDU session, the SMF may receive an 'Nsmf_PDUSession_CreateSMContext' request message as a PDU session request message from the AMF and transmit an 'Nsmf_PDUSession_CreateSMContext' response message to the AMF in response to the 'Nsmf_PDUSession_CreateSMContext' request message in an association create operation between the AMF and the SMF. For other service operations in Table 1, relevant standards may be referred to, and a detailed description of the other service operations will be avoided herein. Similarly, 'Nsmf_MBSsession' refers to a service operating in an MBS session, and the service includes creation/deletion/modification operations for the MBS session, and these operations may be performed by transmitting and receiving an MBS session request message and an MBS session response message between an AMF and a multicast/broadcast-SMF (MB-SMF) or between an SMF and the MB-SMF.

Referring to FIG. 1A, a cellular system may include a user equipment (UE), a next generation radio access network (NG-RAN), an AMF, a multicast/broadcast user plane function (MB-UPF), an MB-SMF, a policy control function (PCF), an SMF, a user plane function (UPF), a network exposure function (NEF), a multicast/broadcast service function (MBSF), a multicast/broadcast service transport function (MBSTF), an application function (AF), an application server (AS), a user data repository (UDR), and an authentication server function (AUSF).

According to an embodiment of the disclosure, the AF/AS may be implemented as a vehicle-to-everything (V2X) application server, a cellular Internet of things (CIoT) application server, a mission critical push to talk (MCPTT) application, a content provider, a TV or audio service provider, a streaming video service provider, or the like. The terms AS and AF may be used in the same meaning.

According to an embodiment of the disclosure, when the AF/AS requests a multicast service, the MBSF being a network function that manages a multicast service session and controls traffic in the 5G system and the MBSTF being a multicast service media anchor in 5GS, which receives media from the AS (or content provider) and processes media traffic under the control of the MBSF, receive the multicast service request from the AF.

An MBSF 120 may provide a function at a service level, for supporting an MBS in conjunction with the AF and an MB-SMF 130. In addition, the MBSF 120 may select the MB-SMF 130 that meets a condition, and support functions such as allocation of a multicast session identifier (ID) or a multicast group ID to a multicast service.

The MB-SMF 130 is an entity that manages a multicast session for a multicast service. The MB-SMF 130 may control transmission of multicast data from an MB-UPF 140 to a radio access network (RAN).

The MB-UPF 140 may receive multicast data directly from the AF or may receive multicast data from the MBSTF. Further, the MB-UPF 140 may forward the multicast data to a RAN node or a UPF based on quality of service (QoS).

Referring to FIG. 1A, in the case where the service area of an SMF 110 is area A 100, when a UE moves to area B 101, a PDU session of the UE is serviced through an intermediate SMF (I-SMF) 111 in conjunction with the SMF 110. When the UE wants to receive an MBS in area B 101, the UE requests a join in a desired MBS session, and the join is requested by a PDU session modification request or a PDU session establishment request. The disclosure proposes various embodiments of processing a join request, when a UE makes a join request by a PDU session modification request. When there is no created PDU session, the join is requested by a PDU session establishment request. According to an embodiment of the disclosure, when there is no PDU session created for a data network name (DNN) or a network slice (single network slice selection assistance information (S-NSSAI)) for the multicast service, the UE may make a join request by making a PDU session establishment request for the DNN or the network slice (S-NSSAI).

Figure 1B:
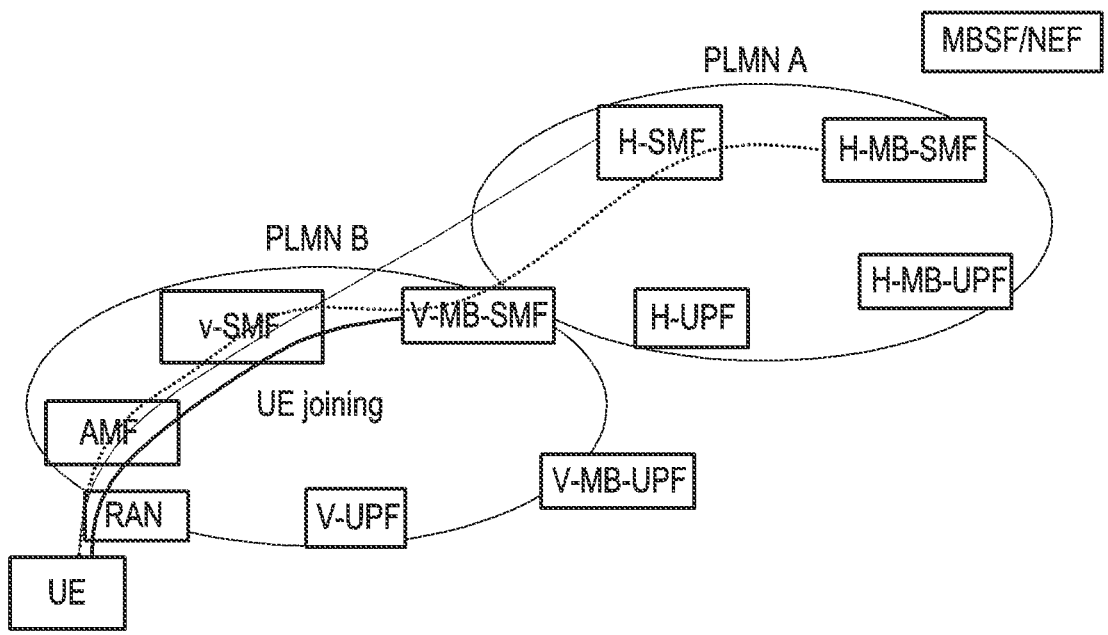
FIG. 1B is a simplified diagram illustrating a scenario in which a roaming UE joins a multicast service of a home network and a multicast service of a roaming network according to an embodiment of the disclosure.

FIG. 1B is a simplified diagram illustrating a scenario in which a roaming UE joins a multicast service of a home network and a multicast service of a roaming network according to an embodiment of the disclosure.

Particularly, in a situation where a UE with public land mobile network (PLMN) A as a home operator moves to PLMN B and roams, when the UE wants to receive an MBS, the UE requests a join in a desired MBS session, and the join request is made by a PDU session modification request or a PDU session establishment request. The disclosure proposes various embodiments of processing a join request, when a UE makes a join request by a PDU session modification request for a PDU session routed to a PLMN from which the UE wants a multicast service.

When there is no created PDU session routed to the PLMN from which the UE wants the multicast service, the UE makes a join request by a PDU session establishment request routed to the PLMN. According to an embodiment of the disclosure, when there is no PDU session created for a DNN or network slice (S-NSSAI) for the multicast service and the PLMN, the UE may make a join request by making a PDU session establishment request for the DNN or network slice (S-NSSAI) and the PLMN.

Figure 2A:
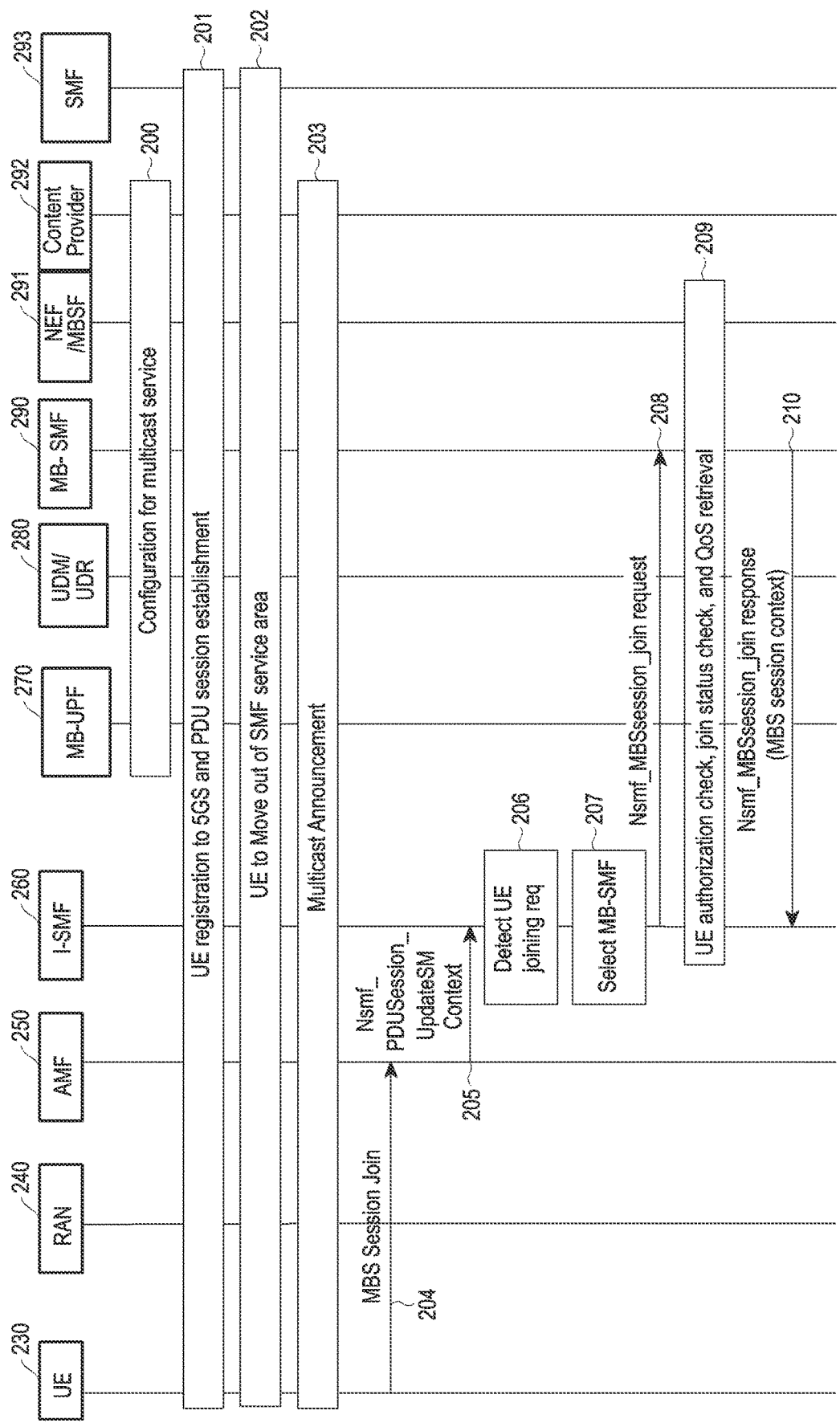
FIGS. 2A and 2B are diagrams illustrating signal flows for a procedure of processing a join request in an intermediate SMF (I-SMF), when a UE located outside the service area of a serving SMF joins a multicast service according to various embodiments of the disclosure.
Figure 2B:
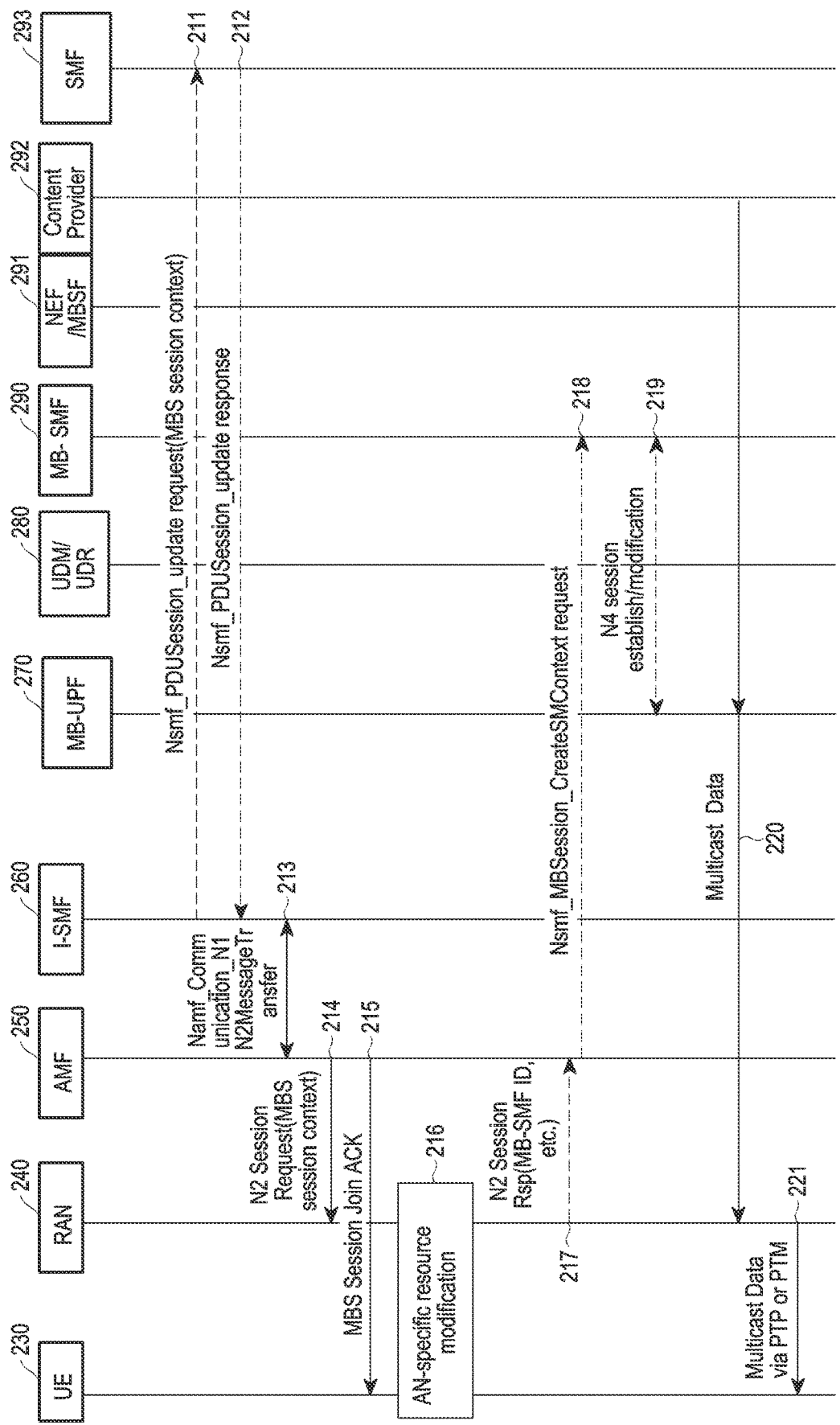

FIGS. 2A and 2B are diagrams illustrating signal flows for a procedure of processing a join request in an I-SMF, when a UE located outside the service area of a serving SMF joins a multicast service according to various embodiments of the disclosure.

Among NF services provided by an AMF that manages access, service operations related to communication are defined in the 5G standard (TS 23.502) as described in Table 2 below.

TABLE 2

Table 5.2.2.1-1: List of AMF Services

| Service Name | Service Operations | Operation Semantic | Known Consumer(s) |
|---|---|---|---|
| Namf_Communication | UEContextTransfer | Request/Response | Peer AMF |
|  | CreateUEContext | Request/Response | Peer AMF |
|  | ReleaseUEContext | Request/Response | Peer AMF |
|  | RegistrationStatusUpdate | Request/Response | Peer AMF |
|  | N1MessageNotify | Subscribe/Notify | PCF, LMF, Peer AMF |
|  | N1N2MessageSubscribe |  | PCF |
|  | N1N2MessageUnSubscribe |  | PCF |
|  | N1N2MessageTransfer | Request/Response | SMF, SMSF, PCF, LMF |
|  | N1N2TransferFailureNotification | Subscribe/Notify | SMF, SMSF, PCF, LMF |
|  | N2InfoSubscribe | Subscribe/Notify | NOTE 1 |
|  | N2InfoUnSubscribe |  | NOTE 1 |
|  | N2InfoNotify |  | AMF, LMF |
|  | EBIAssignment | Request/Response | SMF |
|  | AMFStatusChangeSubscribe | Subscribe/Notify | SMF, PCF, NEF, SMSF, UDM |
|  | AMFStatusChangeUnSubscribe | Subscribe/Notify | SMF, PCF, NEF, SMSF, UDM |
|  | AMFStatusChangeNotify | Subscribe/Notify | SMF, PCF, NEF, SMSF, UDM |
|  | NonUeN2MessageTransfer | Request/Response | Peer AMF, CBCF, PWS-IWF, LMF |
|  | NonUeN2InfoSubscribe | Subscribe/Notify | CBCF, PWS-IWF |
|  | NonUeN2InfoUnSubscribe |  | CBCF, PWS-IWF |
|  | NonUeN2InfoNotify |  | CBCF, PWS-IWF, LMF |

In Table 2, 'Namf_communication' means a service that enables communication between a UE and NR, and the service includes operations such as creation/deletion/registration of UEContext. For other service operations in Table 2, relevant standards may be referred to, and a detailed description of the other service operations will be avoided herein.

Referring to FIGS. 2A and 2B, upon request of a content provider 292 or an AF, a process of configuring a multicast service starts in a 5G network in operation 200. According to an embodiment of the disclosure, a multicast service ID or multicast session ID for the multicast service requested in operation 200 is determined by an NEF/MBSF 291, an MB-SMF 290 for managing a multicast session is selected, and QoS information including information about an ID of the selected MB-SMF 290, information about a group of UEs capable of receiving the multicast service, and so on are stored as an MBS session context together with the multicast session ID and the multicast service ID in a unified data management (UDM)/UDR 280 or the NEF/MBSF 291.

In operation 201, a UE 230 registers with 5G and creates a PDU session, and a serving SMF 293 manages the PDU session. However, when the UE 230 moves out of the service area of the serving SMF 293, an AMF 250 selects an I-SMF 260 in consideration of the location of the UE 230 and transmits a non-access stratum (NAS) message for controlling the PDU session to the serving SMF 293 through the I-SMF 260, so that the serving SMF 293 may process the NAS message or tunnel information between a RAN 240 and a UPF may be controlled, in operation 202.

In operation 203, the UE 230 receives information for receiving the multicast service by a multicast announcement message. According to an embodiment of the disclosure, the multicast announcement message may include at least one of an MBS service ID, an MBS session ID, DNN information for the multicast service, S-NSSAI for the multicast service, a source multicast Internet protocol (IP) address for multicast service traffic, information about the ID of a PLMN servicing the multicast service, information about an area, that is, a tracking area (TA), information about a cell ID list, or geographic location information. The multicast announcement message may be transmitted to the UE 230 through an application or in a UE route selection policy (URSP) by a PCF.

In operation 204, upon receipt of the multicast announcement message, the UE 230 determines to receive the multicast service and transmits an MBS session join request message to the AMF 250. The MBS session join request message may include information such as the ID of the multicast service to join or the ID of the multicast session to join, and a PDU session establishment request message or a PDU session modification request message is transmitted in a NAS session management (SM) message to the I-SMF 260 through the AMF 250.

According to an embodiment of the disclosure, since the UE 230 has already created the PDU session, the UE may use the PDU session modification request message.

When the UE 230 transmits the MBS session join request message in the PDU session modification request message, the AMF 250 forwards the PDU session modification request message to the I-SMF 260 in operation 205. Upon receipt of the PDU session modification request message, the I-SMF 260 identifies that the MBS session join request message has been received and processes the join request in operation 206. That is, when the I-SMF 260 does not have an MBS session context for the multicast session ID, the I-SMF 260 detects the MB-SMF 290 that manages the multicast session ID. The I-SMF 260 requests both of the multicast session ID and MB-SMF information from an NRF, an NEF, an MBSF, a PCF, or a UDM and receives MB-SMF ID information or MB-SMF address information. The I-SMF 260 selects the MB-SMF 290 based on the MB-SMF ID information or the MB-SMF address information in the received MB-SMF information in operation 207.

In operation 208, the I-SMF 260 transmits a multicast session join request message to the selected MB-SMF 290. The multicast session join request message may include at least one of a subscription permanent identifier (SUPI) of the UE 230, a generic public subscription identifier (GPSI) of the UE 230, or the multicast session ID. In operation 209, the MB-SMF 290 inquires the UDM, the MBSF, or the NEF about whether to accept the join request of the UE 230 and determines whether to accept the join request based on a result of the inquiry. In operation 210, the MB-SMF 290 notifies the I-SMF 260 of the result of the join request by a join request response message, and when the join request is accepted, includes an MBS session context for the requested multicast session in the join request response message. The MBS session context may include the MB-SMF ID information, the QoS information, the information of the group of UEs capable of receiving the multicast service, the MBS session ID, the MBS service ID, and so on.

According to an embodiment of the disclosure, before the join request is transmitted to the MB-SMF 290 in operation 208, the I-SMF 260 may determine whether to accept the join request of the UE 230 by inquiring the UDM, the MBSF, or the NEF about whether to accept the join request in operation 209.

In operation 211, the I-SMF 260 transmits the received PDU session modification request message to the serving SMF 293, to process the PDU session modification request message, and also transmits the MBS session context received in operation 210 to the serving SMF 293 to associate the multicast session ID with the PDU session and store the association.

In operation 212, the serving SMF 293 transmits the result of processing a PDU session modification together with the information about the multicast session ID to the I-SMF 260 by a PDU session modification command message. That is, in operation 212, the serving SMF 293 notifies the I-SMF 260 of the association between the multicast session ID and the PDU session. In operations 213, 214 and 215, an MBS join ACK message together with the PDU session modification command message as a NAS SM message directed to the UE 230 is transmitted to the UE 230 for AN-specific resource modification in operation 216. The serving SMF 293 includes the MBS join ACK message in the PDU session modification command message, or the I-SMF 260 includes the MBS join ACK message in the PDU session modification command message received from the serving SMF 293. Then, the PDU session modification command message is transmitted to the UE 230. The I-SMF 260 transmits the MBS session context and PDU session information to the AMF 250 in operation 213, and the AMF 250 transmits the MBS session context and the PDU session information to the RAN 240 in operation 214. Accordingly, the RAN 240 obtains the association between the multicast session and the PDU session.

According to an embodiment of the disclosure, when the RAN 240 has already created a shared tunnel for the multicast session, the UE 230 receives traffic for the multicast session in operations 220 and 221. The shared tunnel is a tunnel for transmitting multicast data traffic for the multicast session from an MB-UPF to the RAN 240.

According to an embodiment of the disclosure, in the case where although the RAN 240 supports multicast, the shared tunnel for the multicast session has not yet been created, the RAN 240 transmits an N2 session response message to the AMF 250 in order to request shared tunnel setup in operation 217. The N2 session response message includes the MB-SMF ID, the multicast session ID, and shared tunnel endpoint information for receiving the multicast session traffic. The endpoint information may include the IP address of the RAN 240 and a shared tunnel ID.

In operation 218, upon receipt of the N2 session response message, the AMF 250 transmits the multicast session ID and the information about the end point of the shared channel for receiving multicast session traffic in an Nsmf_MBSession_CreateSMContext request message or an Nsmf_MBSession_UpdateSMContext request message to the MB-SMF 290 corresponding to the MB-SMF ID. In operation 219, the MB-SMF 290 transmits the multicast session ID and the information about the end point of the shared tunnel for receiving the multicast session traffic to an MB-UPF 270. In operation 220, the MB-UPF 270 transmits multicast data traffic received from the content provider 292 or an MBSTF to the RAN 240. The RAN 240 transmits the multicast session traffic received through the shared tunnel in a point-to-multicast manner or a point-to-point manner. The information about the endpoint may include a tunnel ID and RAN address information, as information for identifying a tunnel between the RAN of the shared tunnel and the MB-UPF 270 tunnel.

Figure 3:
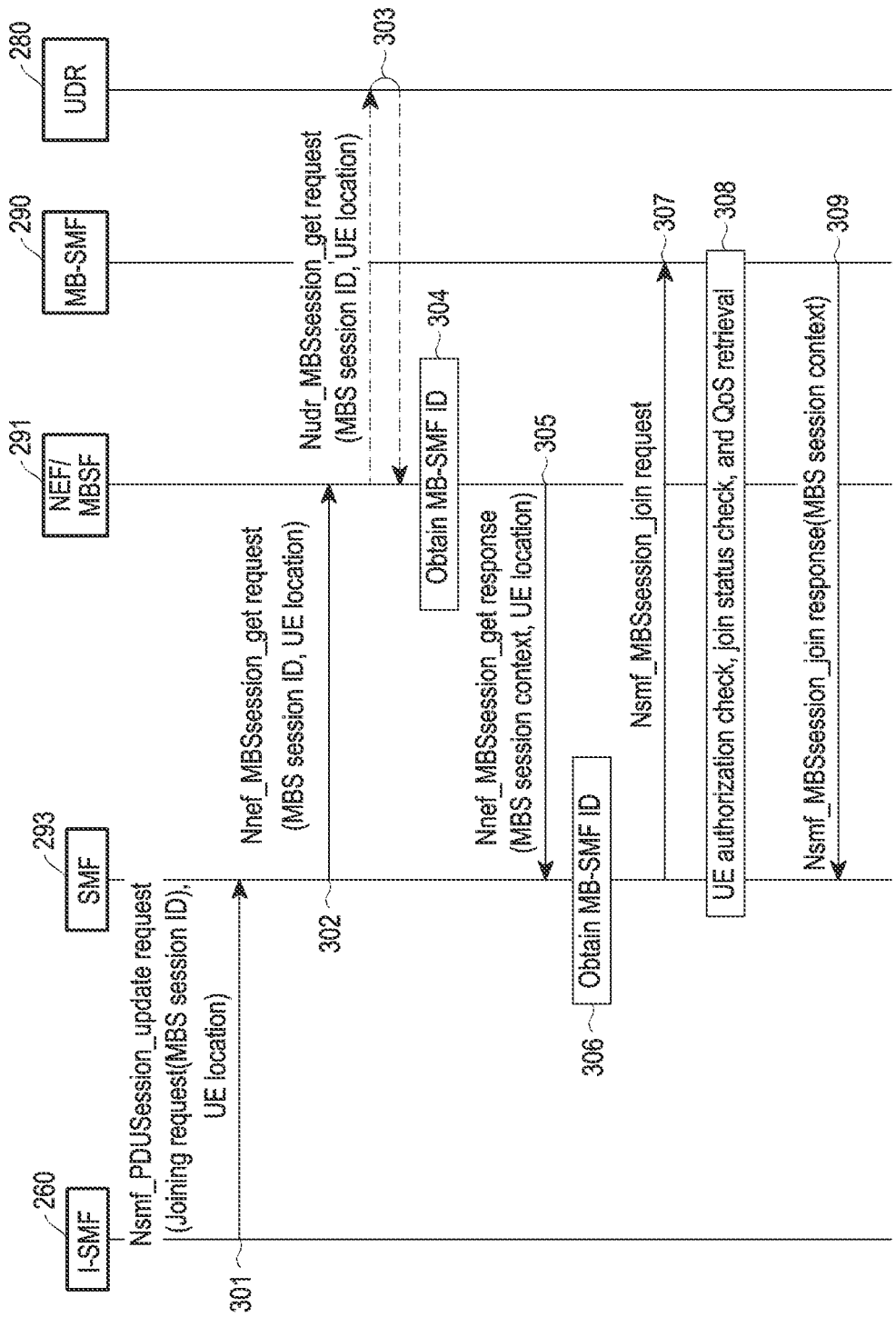
FIG. 3 is a diagram illustrating a signal flow for a procedure of processing a join request in a serving SMF, when a UE located outside the service area of the serving SMF joins a multicast service according to an embodiment of the disclosure.

FIG. 3 is a diagram illustrating a signal flow for a procedure of processing a join request in a serving SMF, when a UE located outside the service area of the serving SMF joins a multicast service according to an embodiment of the disclosure.

While FIGS. 2A and 2B illustrate a method of directly processing a join request message by an I-SMF, FIG. 3 illustrates a method of processing a join request message by a serving SMF. According to an embodiment of the disclosure, the embodiment of FIG. 3 substitutes for operations 206 to 212 of FIGS. 2A and 2B.

In the embodiment of FIG. 3, when the AMF 250 receives a join request message in a PDU session modification request message from the UE 230, the AMF 250 identifies that the I-SMF 260 is used for a corresponding PDU session, and includes UE location information in the received PDU session modification request message, when transmitting the PDU session modification request message received in a Nsmf_PDUSession_UpdateSM Context message to the I-SMF 260. The UE location information may be a TA or a cell ID list.

Referring to FIG. 3, upon receipt of the PDU session modification request message, the I-SMF 260 transmits an Nsmf_PDUSession_update request (Joining request (MBS session ID)) to the serving SMF 293 in operation 301. When the I-SMF 260 transmits the Nsmf_PDUSession_update request (Joining request (MBS session ID)) to the serving SMF 293, the I-SMF 260 also transmits the UE location information.

When the SMF 293 does not have an MBS session context for an MBS session ID for a UE location, the SMF 293 requests information about the ID of an MS-SMF that controls the MBS session ID for the UE location, or an MBS session context by transmitting an Nnef_MBSsession_get request (MBS session ID, UE location) message to the NEF/MBSF 291 in operation 302.

When there is no corresponding information in the NEF/MBSF 291, the SMF 293 obtains the information about the ID of the MS-SMF that controls the MBS session ID for the UE location, or the MBS session context from the UDR 280 in operation 303. In operations 305 and 306, the NEF/MBSF 291 transmits the obtained MB-SMF ID information or MBS session context information to the serving SMF 293.

According to an embodiment of the disclosure, the SMF may obtain the information about the ID of the MS-SMF that controls the MBS session ID for the UE location, or the MBS session context by using the NRF, the UDM, or the PCF instead of the NEF/MBSF 291.

In operation 307, the serving SMF 293 transmits a multicast session join request message to the selected MB-SMF 290. According to an embodiment of the disclosure, the multicast session join request message may include information about the SUPI or GPSI of the UE 230 and the multicast session ID. In operation 308, the MB-SMF 290 determines whether to accept the join request of the UE by inquiring the UDM or the NEF/MBSF 291. In operation 309, the MB-SMF 290 notifies the serving SMF 293 of the result of the determination as to whether to accept the join request of the UE by a join request response message. When the join request of the UE is accepted, the join request response message includes the MBS session context for the requested multicast session. According to an embodiment of the disclosure, the MBS session context may include the MB-SMF ID information, the QoS information, the information about the group of UEs capable of receiving the multicast service, the MBS session ID, the MBS service ID, and so on.

According to an embodiment of the disclosure, the serving I-SMF 260 may determine whether to accept the join request of the UE by inquiring the UDM or the NEF/MBSF 291 before transmitting the join request to the MB-SMF 290 in operation 307.

Figure 4A:
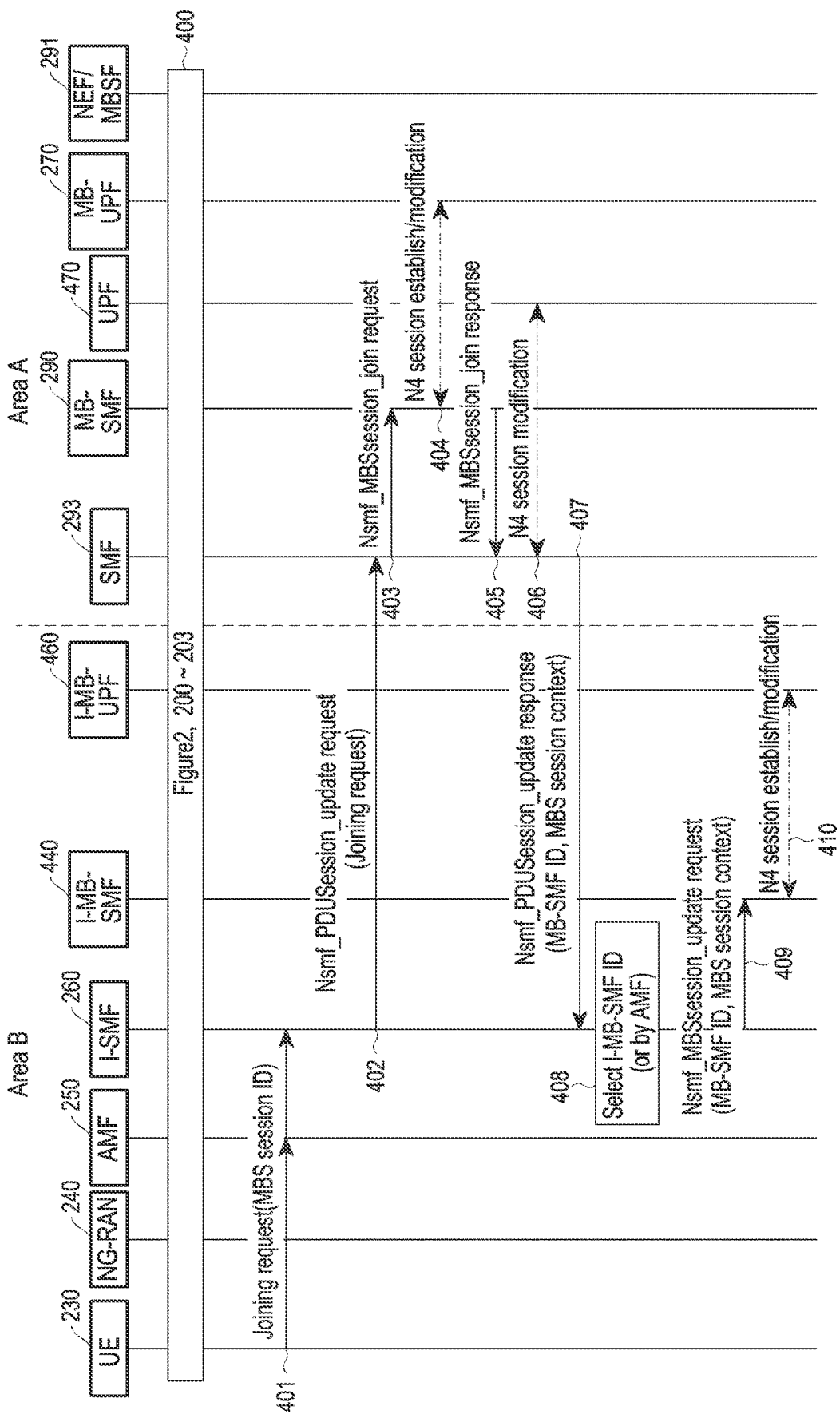
FIGS. 4A and 4B are diagrams illustrating signal flows for a procedure of processing a join request in a serving SMF to provide a multicast service through an intermediate-multicast/broadcast-SMF (I-MB-SMF), when a UE located outside the service area of the serving SMF joins the multicast service according to various embodiments of the disclosure.
Figure 4B:
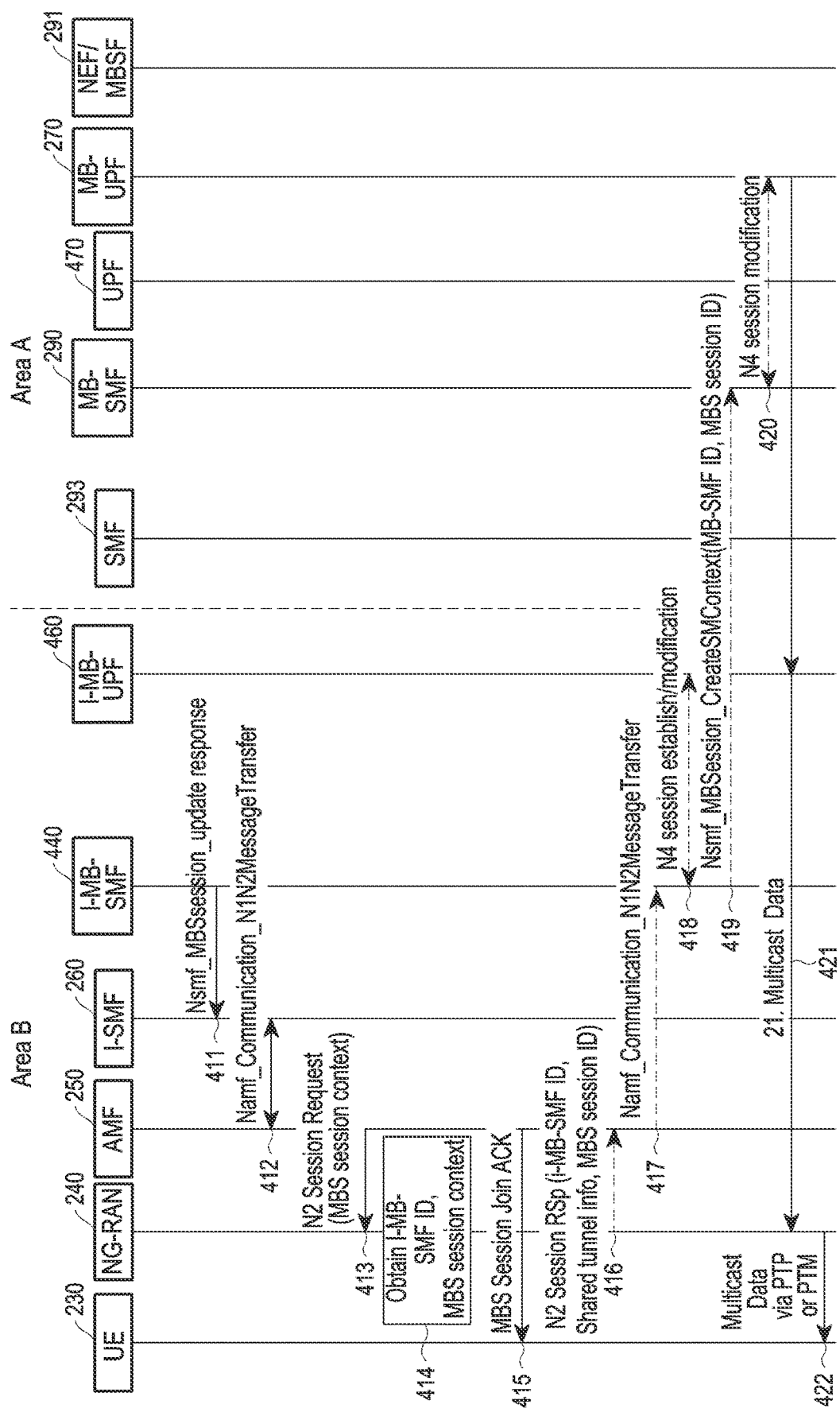

FIGS. 4A and 4B are diagrams illustrating signal flows for a procedure of processing a join request by a serving SMF to provide a multicast service through an intermediate-MB-SMF (I-MB-SMF), when a UE located outside the service area of the serving SMF joins a multicast service according to various embodiments of the disclosure.

According to an embodiment of the disclosure, when a UE wants to receive a multicast service outside the serviceable area of an MB-SMF, an I-SMF or an AMF designates an I-MB-SMF being another MB-SMF capable of providing the multicast service to the location of the UE and controls a shared tunnel from an MB-UPF to a RAN.

Referring to FIGS. 4A and 4B, as in operations 200 to 203 of FIG. 2A, a multicast service configuration, network registration of a UE, and PDU session creation are performed, and the UE outside the service area of the serving SMF 293 receives a multicast service announcement message. That is, upon request of the content provider 292 or the AF, a process of configuring a multicast service in a 5G network is performed. In this configuration process, a multicast service ID or a multicast session ID for the requested multicast service is determined by the NEF/MBSF 291, the MB-SMF 290 for managing the multicast session is selected, QoS information including information about the ID of the selected MB-SMF, and information about a group of UEs capable of receiving the multicast service are stored as an MBS session context, together with the multicast session ID and the multicast service ID in the UDR, the UDM, or the NEF/MBSF. The UE 230 registers with 5G and creates a PDU session. The PDU session is managed by the serving SMF 293. However, when the UE 230 moves out of the service area of the serving SMF 293, the AMF 250 selects the I-SMF 260 in consideration of the location of the UE 230 and transmits a NAS message for controlling the PDU session to the serving SMF 293 through the I-SMF 260, so that the serving SMF 293 may process the NAS message or tunnel information between the RAN 240 and the UPF may be controlled. The UE 230 receives information for receiving the multicast service by a multicast announcement message. According to an embodiment of the disclosure, the multicast announcement message may include at least one of an MBS service ID, an MBS session ID, DNN information for the multicast service, S-NSSAI for the multicast service, a source multicast IP address for multicast service traffic, information about the ID of a PLMN servicing the multicast service, information about an area, that is, a TA, information about a cell ID list, or geographic location information. The multicast announcement message may be transmitted to the UE 230 through an application or in a URSP by the PCF.

Referring to FIGS. 4A and 4B, operations 200 to 203 of FIG. 2A are performed in operation 400. That is, the UE 230 receives the service announcement message. In operation 401, the UE 230 determines to join an MBS session and transmits an MBS session join request message to the I-SMF 260. The MBS session join request message may include information such as the ID of the multicast service to join or the ID of the multicast session to join. The MBS session join request message is transmitted in a NAS SM message (e.g., a PDU session establishment request message or a PDU session modification request message) to the serving SMF 293 through the AMF 250.

According to an embodiment of the disclosure, since the UE 230 has already created the PDU session, the UE 230 may use the PDU session modification request message.

When the UE 230 transmits the MBS session join request message in the PDU session modification request message, the AMF 250 forwards the PDU session modification request message to the I-SMF 260. In operation 402, the I-SMF 260 transmits the MBS session join request message in an Nsmf_PDUSession_update request (Joining request) message to the serving SMF 290. When the serving SMF 290 does not have an MBS session context for the multicast session ID, the serving SMF 290 detects the MB-SMF 290 that manages the multicast session ID. The serving SMF 290 processes the join request by transmitting a multicast session join request message to the MB-SMF 290 in operation 403. In operation 404, the MB-SMF 290 modifies or obtains information for receiving multicast session traffic from the MB-UPF 270. In operation 405, the MB-SMF 290 transmits the MBS session context for the multicast session to the serving SMF 293, as a response message to the MBS session join request message, and the serving SMF 293 associates the multicast session ID with the PDU session and stores the association.

The MBS session context may include information about an MB-SMF ID, QoS information, information about a group of UEs capable of receiving the multicast service, the MBS session ID, the MBS service ID, and so on.

The serving SMF 293 may modify the PDU session with the UPF 470 in response to the received PDU session modification request, and then transmit an Nsmf_PDUSession_update response message to the I-SMF 260 in response to the PDU session modification request in operations 406 and 407. The Nsmf_PDUSession_update response message is transmitted to the I-SMF 260, together with or as a separate message from information about the MB-SMF ID and information about the MBS session context. In operation 408, the I-SMF 260 is aware that the UE 230 is outside a service area corresponding to the MB-SMF ID, and thus selects an MB-SMF within its service area as the I-MB-SMF 440.

According to an embodiment of the disclosure, in a method of selecting the I-MB-SMF, upon receipt of the MBS session join request message in operation 401, the AMF 360 may detect an MB-SMF available at the location of the UE through the NRF, and transmit information about the ID or address of the I-MB-SMF to the I-SMF 260, so that the I-SMF 260 may select the I-MB-SMF in operation 408.

According to an embodiment of the disclosure, in a method of selecting the I-MB-SMF, operations 408 to 411 are not pre-performed, and when there is no corresponding shared tunnel in the RAN and thus the RAN requests shared channel setup from the AMF in operation 416, the AMF may discover an MB-SMF available at the location of the UE through the NRF, identifying that an MB-SMF corresponding to an MB-SMF ID included in the request received from the RAN is located in a non-serviceable area, select the discovered MB-SMF as the I-MB-SMF as in operation 408, and transmit the MBS session context including the MB-SMF ID and shared tunnel endpoint information of the RAN, for the multicast session, for example, information about the address of the RAN and a tunnel ID, so that the shared channel may be established as in operation 417. As in operation 418, the I-MB-SMF selects an MB-UPF from among available MB-UPFs, as an I-MB-UPF, and establishes a shared tunnel between the RAN and the I-MB-UPF by transmitting the shared tunnel endpoint information received from the RAN to the I-MB-UPF.

Further, the I-MB-SMF obtains shared tunnel endpoint information for a shared tunnel with the MB-UPF for the multicast session of the I-MB-UPF, for example, information about the ID or address of the I-MB-UPF, and a tunnel ID, requests shared tunnel setup by transmitting the MBS session context including the MB-SMF ID, and the shared tunnel endpoint information for the multicast session to the MB-SMF as in operation 419. The MB-SMF forwards the information to the MB-UPF to create the shared tunnel between the MB-UPF and the I-MB-UPF and thus eventually create a shared tunnel for the multicast session from the MB-UPF to the RAN as in operation 420. Therefore, multicast traffic may be received as in operations 421 and 422.

When the I-SMF 260 selects the I-MB-SMF 440 as in operation 408 of FIG. 4A, the I-SMF 260 transmits information about the MB-SMF ID and information about the MBS session context to the selected I-MB-SMF 440 in operation 409, and the I-MB-SMF 440 selects the I-MB-UPF 460 to establish a shared tunnel between the MB-UPF 270 and the RAN 240 in operation 410, and configures and transmits tunnel information for transmitting the multicast session to the I-SMF 260 in operation 411.

In operations 412, 413, and 415, the I-SMF 260 transmits, to the UE 230, an MBS join ACK message together with the PDU session modification command message as a NAS SM message directed to the UE 230. The MBS join ACK message is included in the PDU session modification command message by the serving SMF 293, or the MBS join ACK message is included in the PDU session modification command message received from the serving SMF 293 by the I-SMF 260, for transmission to the UE 230.

In operation 412, the I-SMF 260 transmits the MBS session context including the MB-SMF ID and the I-MB-SMF ID, and information about the PDU session to the AMF 250. In operation 413, the AMF 250 transmits the information about the MBS session context including the MB-SMF ID and the I-MB-SMF ID, and the information about the PDU session to the RAN 240. In operation 414, the RAN 240 obtains an association between the multicast session and the PDU session.

When the RAN 240 has already created a shared tunnel for the multicast session, the UE receives traffic for the multicast session in operations 421 and 422.

On the contrary, when the RAN 240 may support multicast and has not yet created a shared tunnel for the multicast session, the RAN 240 transmits an N2 session response message to the AMF 250 to request shared tunnel setup in operation 416. The N2 session response message includes the I-MB-SMF ID or MB-SMF ID, the multicast session ID, and shared tunnel endpoint information for receiving multicast session traffic. The endpoint information includes the IP address of the RAN node and a shared tunnel ID.

Upon receipt of the N2 session response message, the AMF 250 transmits the multicast session ID and the shared tunnel endpoint information for receiving multicast session traffic to the I-MB-SMF 440 by an Nsmf_MBSession_CreateSMContext request message or an Nsmf_MBSession_UpdateSMContext request message in operation 417. The I-MB-SMF 440 forwards the Nsmf_MBSession_CreateSMContext request message or the Nsmf_MBSession_UpdateSMContext request message to the MB-SMF 290. According to an embodiment of the disclosure, the AMF 250 transmits the MBS session context including the MB-SMF ID and the shared tunnel endpoint information for the multicast session of the RAN, for example, the information about the address of the RAN, and the tunnel ID to the I-MB-SMF 440 to establish the shared tunnel in operation 417. In operation 418, the I-MB-SMF 440 forwards the shared tunnel endpoint information to the I-MB-UPF 460 to establish the shared tunnel between the RAN 240 and the I-MB-UPF 460. The I-MB-SMF 440 obtains shared tunnel endpoint information for a shared tunnel with the MB-UPF, for the multicast session, for example, information about the ID or address of the I-MB-UPF 460 and a tunnel ID. In operation 419, the I-MB-SMF 440 requests shared tunnel setup by transmitting the MBS session context including the MB-SMF ID and the shared tunnel endpoint information for the multicast session to the MB-SMF 290. In operation 420, the MB-SMF 290 transmits a shared tunnel setup request message to the MB-UPF 270 and creates a shared tunnel between the MB-UPF 270 and the I-MB-UPF 460. In operation 421, I-MB-UPF 460 transmits multicast data traffic received from the content provider or the MBSTF eventually from the MB-UPF 270 to the RAN 240. In operation 422, the RAN 240 transmits the multicast session traffic received through the shared tunnel to the UE 230 in a point-to-multicast method or a point-to-point method.

Figure 5A:
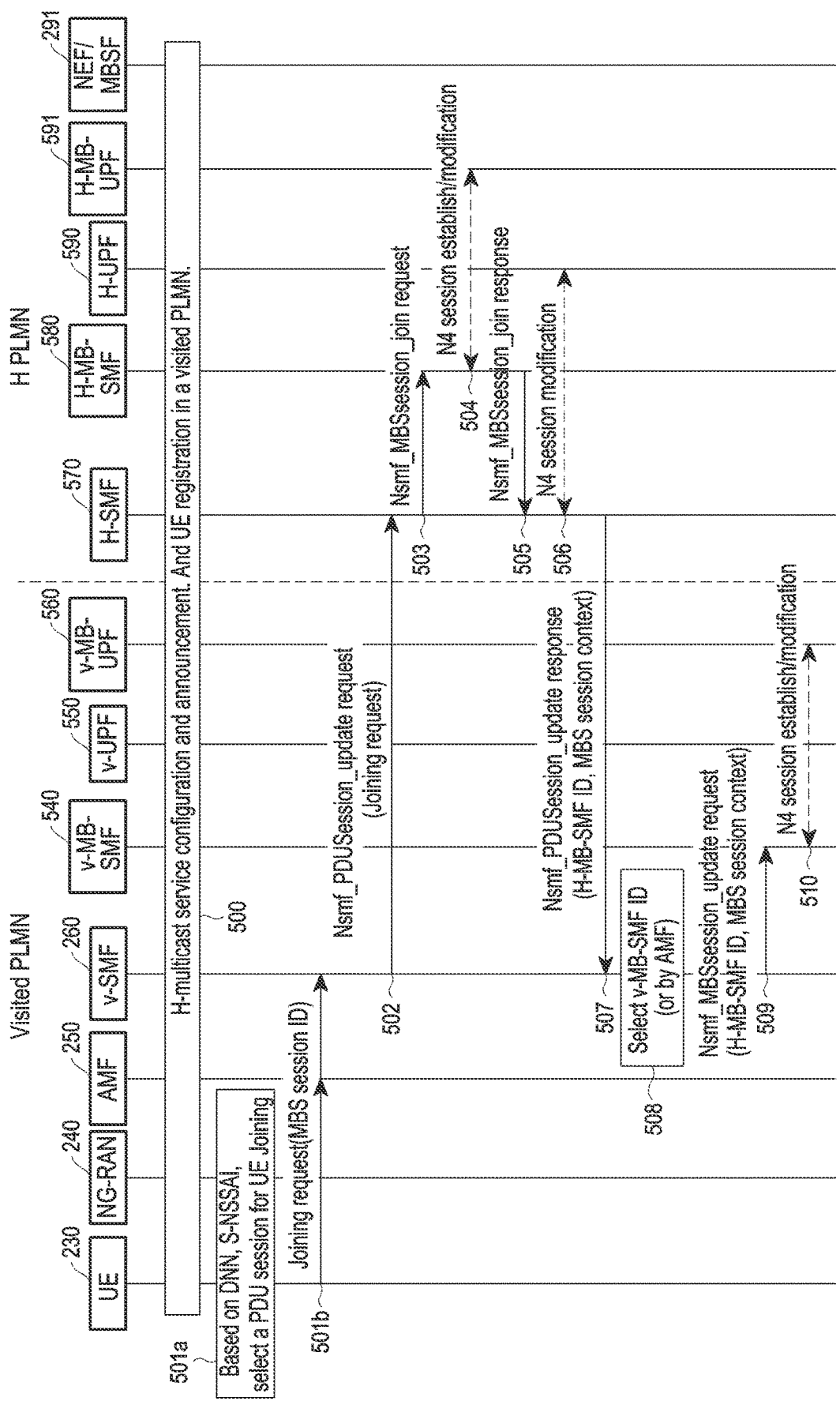
FIGS. 5A and 5B are diagrams illustrating signal flows for a procedure of providing a service in a shared delivery method, when a roaming UE joins a multicast service of a home operator according to various embodiments of the disclosure.
Figure 5B:
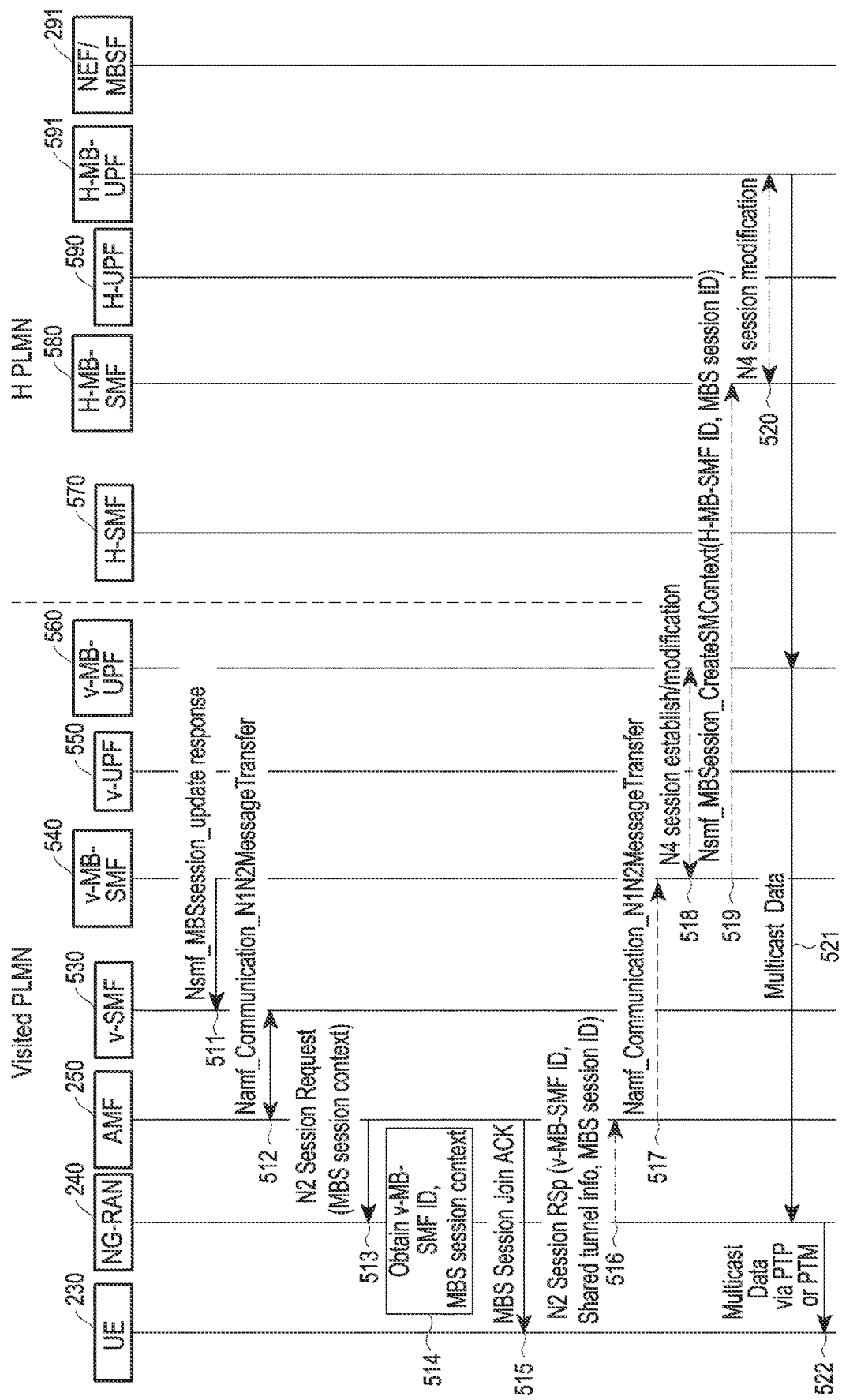

FIGS. 5A and 5B are diagrams illustrating a procedure of providing a service in a shared delivery method, when a roaming UE joins a multicast service of a home operator according to various embodiments of the disclosure.

Referring to 5A and 5B, V and H in the names of entities mean visited and home, respectively.

Referring to 5A and 5B, in a situation where a multicast service is configured in a home PLMN of the UE 230 and a multicast service announcement is made for the multicast service, the UE 230 registers in a visited PLMN and determines to use the multicast service in operation 500.

The UE 230, which has registered in a roaming network, may use a multicast service provided by the roaming network and a multicast service provided by the home network. Therefore, upon receipt of a service announcement message, the UE 230 should be able to identify a network that provides a multicast service. For this purpose, the service announcement message may make a reference to a PLMN ID included in a multicast session ID or a PLMN ID included in a multicast group ID, or may include a PLMN ID identifying a network providing the service.

In operation 501*a*, the roaming UE 230 creates and selects an appropriate PDU session according to a PLMN that provides an intended multicast service. For example, in the absence of a PDU session for the PLMN providing the service and a corresponding DNN or S-NSSAI, the UE 230 may request PDU session establishment based on DNN information and S-NSSAI included in the service announcement message, whereas in the presence of the PDU session, the UE 230 transmits an MBS session join request to the AMF 250 by a PDU session modification request in operation 501*b*. Although the description is based on the assumption that the PDU session modification request is used in consideration of the assumption that the intended multicast service is provided by the home operator and the situation where the PDU session has already been crated for the DNN or the S-NSSAI, a PDU session establishment request message may also be used in a similar manner.

The MBS session join request message may include information such as the ID of the multicast service to join or the ID of a multicast session to join. The MBS session join request message may be included in a NAS SM message such as a PDU session establishment request message or a PDU session modification request message and transmitted to the SMF through the AMF.

Upon receipt of the MBS session join request message included in the PDU session modification request message from the UE 230, the AMF 250 transmits the MBS session join request message to a V-SMF 530. In operation 502, the V-SMF 530 transmits the MBS session join request message to an H-SMF 570 by using an Nsmf_PDUSession_update request (Joining request) message. In operations 503, 504 and 505, when the H-SMF 570 does not have an MBS session context for the multicast session ID, the H-SMF 570 detects and selects an H-MB-SMF 580 that manages the multicast session ID and transmits the multicast session join request message to the selected H-MB-SMF 580, to process the join request. For example, the H-MB-SMF 580 modifies or obtains information for receiving multicast session traffic, from an H-MB-UPF 591 in operation 504, and transmits the MBS session context for the multicast session to the H-SMF 570 in response in operation 505. The H-SMF 570 associates between the multicast session ID with the PDU session based on the MBS session context and stores the association.

The MBS session context may include information about an H-MB-SMF ID, QoS information, information about a group of UEs capable of receiving the multicast service, an MBS session ID, an MBS service ID, and so on.

In operation 506, the H-SMF 570 may modify the PDU session with an H-UPF 590 according to the received PDU session modification request. In operation 507, the H-SMF 570 transmits an Nsmf_PDUSession_update response message to the V-SMF 530 in response to the PDU session modification request. The Nsmf_PDUSession_update response message delivers information about an H-MB-SMF ID and information about the MBS session context together or as separate messages to the V-SMF 530.

In operation 508, the V-SMF 530 identifies that the UE 230 is in its own network outside a service area corresponding to the H-MB-SMF ID, and selects an MB-SMF in its service area as a V-MB-SMF 540.

According to an embodiment of the disclosure, in another method of selecting the V-MB-SMF, when the AMF 250 receives the MBS session join request message in operation 501*b*, the AMF 250 detects an MB-SMF available at the location of the UE through the NRF and selects the detected MB-SMF as the V-MB-SMF. When the AMF 250 transmits the MBS join request message, or the PDU session modification request or PDU session establishment request message to the V-SMF, the AMF 250 may transmit information about the ID or address of the V-MB-SMF together with information about the H-SMF, so that the V-SMF may select the V-MB-SMF.

According to an embodiment of the disclosure, in another method of selecting the V-MB-SMF, operations 508 to 511 are not pre-performed, and when there is no corresponding shared tunnel in the RAN and thus the RAN requests shared channel establishment from the AMF in operation 516, the AMF may detect an MB-SMF available at the location of the UE through the NRF, identifying that an H-MB-SMF corresponding to an H-MB-SMF ID included in the request received from the RAN is located in the home network, and selects the detected MB-SMF as the V-MB-SMF. As in operation 517, the AMF transmits an MBS session context including the H-MB-SMF ID, and shared tunnel endpoint information of the RAN, for the multicast session, for example, information about the address of the RAN and a tunnel ID, so that the shared channel may be established. As in operation 518, the V-MB-SMF selects an MB-UPF from among available MB-UPFs, as the V-MB-UPF, and establishes a shared tunnel between the RAN and the V-MB-UPF by transmitting the shared tunnel endpoint information received from the RAN to the V-MB-UPF. Further, the V-MB-SMF obtains shared tunnel endpoint information for a shared tunnel with the V-MB-UPF for the multicast session of the V-MB-UPF, for example, information about the ID or address of the V-MB-UPF, and a tunnel ID, requests shared tunnel setup by transmitting the MBS session context including the H-MB-SMF ID, and the shared tunnel endpoint information for the multicast session to the H-MB-SMF as in operation 519. As in operation 520, the H-MB-SMF transmits the information to the H-MB-UPF to establish a shared tunnel between the H-MB-UPF and the V-MB-UPF and eventually establish a shared tunnel for the multicast session from the H-MB-UPF to the RAN. Therefore, multicast traffic may be received in operations 521 and 522.

When the V-SMF 530 selects the V-MB-SMF 540 as in operation 508, the V-SMF 530 transmits information about the H-MB-SMF ID and information about the MBS session context to the selected V-MB-SMF 540 by an MBS session update request message in operation 509. In operation 510, the V-MB-SMF 540 selects the V-MB-UPF 560 to establish a shared tunnel between the H-MB-UPF 591 and the RAN 240, and transmits tunnel information for transmitting the multicast session to the V-MB-UPF 560. In operation 511, the V-MB-SMF 540 transmits the tunnel information for transmitting the multicast session to the V-SMF 530.

In operations 512, 513, and 515, the V-SMF 530 transmits, to the UE 230, an MBS join ACK message together with a PDU session modification command message as a NAS SM message directed to the UE 230. The MBS join ACK message is included in the PDU session modification command message by the serving SMF 293, or the MBS join ACK message is included in the PDU session modification command message received from the H-SMF 570 by the V-SMF 530, for transmission to the UE 230. In operation 512, the V-SMF 530 transmits an MBS session context including the H-MB-SMF ID and a V-MB-SMF ID, and PDU session information to the AMF 250. In operation 513, the AMF 250 transmits an MBS session context including the H-MB-SMF ID or the V-MB-SMF ID and the PDU session information to the RAN 240. Accordingly, in operation 514, the RAN 240 obtains an association between the multicast session and the PDU session.

When the RAN 240 has already established a shared tunnel for the multicast session, the UE 230 receives traffic for the multicast session in operations 521 and 522.

On the contrary, when the RAN 240 may support multicast and has not yet established a shared tunnel for the multicast session, the RAN 240 transmits an N2 session response message to the AMF 250 to request shared tunnel setup in operation 516. The N2 session response message includes the V-MB-SMF ID or the H-MB-SMF ID, the multicast session ID, and shared tunnel endpoint information for receiving multicast session traffic. The endpoint information includes the IP address of the RAN node and a shared tunnel ID.

Upon receipt of the N2 session response message, the AMF 250 transmits the multicast session ID and the shared tunnel endpoint information for receiving the multicast session traffic to the V-MB-SMF 540 by an Nsmf_MBSession_CreateSMContext request or Nsmf_MBSession_UpdateSMContext request message in operation 517. The V-MB-SMF 540 transmits the Nsmf_MBSession_CreateSMContext request or Nsmf_MBSession_UpdateSMContext request message to the H-MB-SMF 580. According to an embodiment of the disclosure, the MBS session context including the H-MB-SMF ID, and the shared tunnel endpoint information for the multicast session of the RAN 240, for example, information about the address of the RAN 240 and the tunnel ID are transmitted to the V-MB-SMF 540, to establish the shared tunnel in operation 517. In operation 518, the V-MB-SMF 540 transmits the shared tunnel endpoint information to the V-MB-UPF 560 to establish the shared tunnel between the RAN 240 and the V-MB-UPF 560. The V-MB-SMF 540 obtains shared tunnel endpoint information for a shared tunnel with the H-MB-UPF 591, for the multicast session (e.g., information about the ID or address of the V-MB-UPF 560), and a tunnel ID. In operation 519, the V-MB-SMF 540 requests shared tunnel setup by transmitting the MBS session context including the H-MB-SMF ID and the shared tunnel endpoint information for the multicast session to the H-MB-SMF 580. In operation 520, the H-MB-SMF 580 transmits the MBS session context and the shared tunnel endpoint information to the H-MB-UPF 591, and a shared tunnel is established between the H-MB-UPF 591 and the V-MB-UPF 560. In operation 521, the V-MB-UPF 560 transmits multicast data traffic received from the content provider or the MBSTF eventually from the H-MB-UPF 591 to the RAN 240. In operation 522, the RAN 240 transmits the multicast session traffic received through the shared tunnel to the UE 230 in a point-to-multicast method or a point-to-point method.

In another embodiment of FIGS. 5A and 5B, when the UE requests PDU session establishment, the AMF 250 identifies the UE as having an MBS capability in the process of negotiating UE capabilities during registration. When upon receipt of a PDU session establishment request, the AMF 250 identifies a PDU session for a DNN and S-NSSAI requested by the UE is a home routed PDU session from a UE subscription, the AMF 250 selects an SMF having both of an MB-SMF function and an SMF function in a visited PLMN, as the V-SMF 530, and selects an SMF having the SMF function in a home PLMN, as the H-SMF 570. Further, the V-SMF 530 selects a UPF having both of an MB-UPF function and a UPF function as the V-UPF 550. In selecting the SMF having both of the MB-SMF function and the SMF function and selecting the UPF having both the MB-UPF function and the UPF function, the AMF 250 may detect a suitable SMF by requesting an SMF having both of an MBS capability and an MB-SMF capability from the NRF, and the SMF may detect a suitable UPF by requesting a UPF having both the MBS capability and an MB-UPF capability from the NRF.

As such, when the V-SMF 530 and the V-MB-SMF 540 are collocated and the V-UPF 550 and the V-MB-UPF 560 are collocated, operations 508, 509, and 511 are performed as an internal operation of the V-SMF 530, thus causing no more separate messages. To serve as a control-plane proxy for the H-SMF 570 and the H-MB-SMF 580, the V-SMF 530 of the visited PLMN processes services of the PDU session through the H-SMF and services of the MBS session through the H-MB-SMF 580.

According to various embodiments of the disclosure, when the UE 230 receives the multicast service provided by the home network, the V-SMF 530 of the local network may receive a join message from the UE 230. When the UE 230 makes a wrong join request through a local routed PDU session, the V-SMF 530 may transmit a failure message for the join request to the UE 230 in response to the join request message. According to an embodiment, the failure message may include a failure cause. The failure cause may include DNN information and cause information indicating, for example, "multicast service not supported by home PLMN" or "non-supported multicast service". Upon receipt of the failure message, the UE 230 may identify that the UE 230 has selected a PDU session that does not match information included in the service announcement message. When the UE 230 selects another home routed PDU session and makes a join request, or when a suitable home routed PDU session is not created, the UE 230 may make a join request, while creating a home routed PDU session.

Figure 6A:
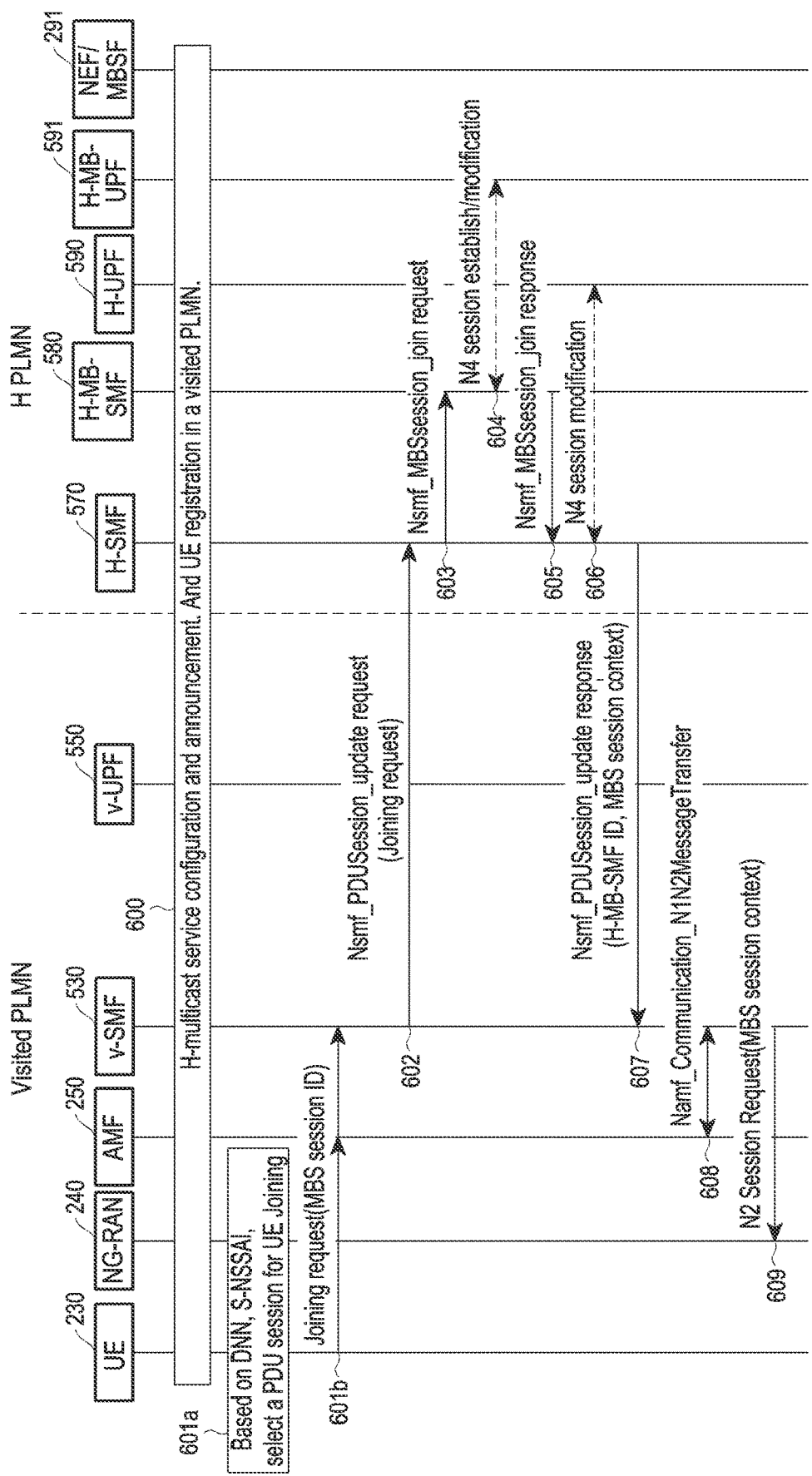
FIGS. 6A and 6B are diagrams illustrating signal flows for a procedure of providing a service in an individual delivery method, when a roaming UE joins a multicast service of a home operator according to various embodiments of the disclosure.
Figure 6B:
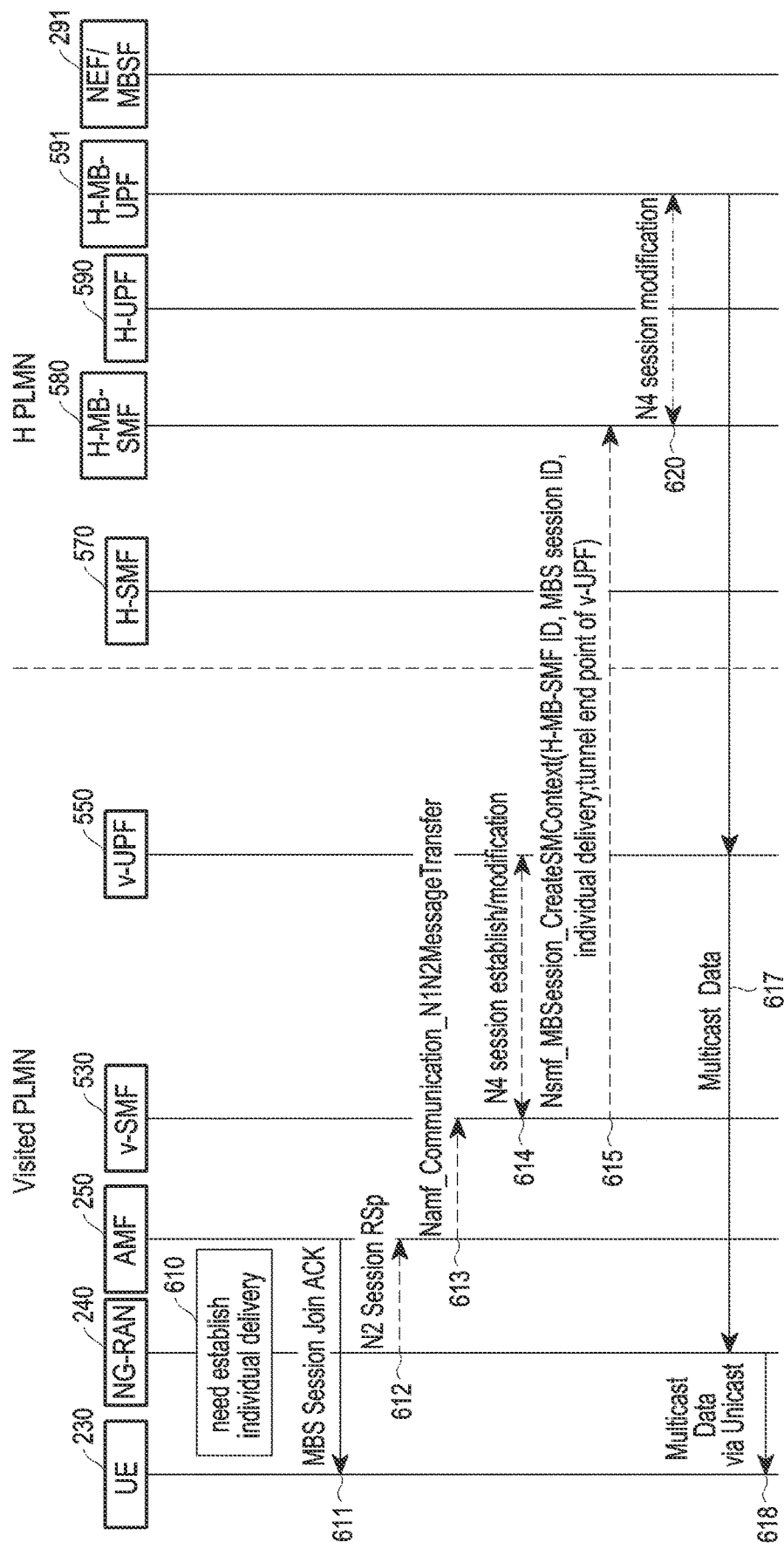

FIGS. 6A and 6B are diagrams illustrating signal flows for a procedure of providing a service in an individual delivery method, when a roaming UE joins a multicast service of a home operator according to various embodiments of the disclosure.

Referring to FIGS. 6A and 6B, in a situation where a multicast service is configured in the home PLMN of the UE 230 and a multicast service announcement is made for the multicast service, the UE 230 registers in the visited PLMN and determines to use the multicast service in operation 600, as described before with reference to other drawings. The UE 230, which has registered in a roaming network, may use a multicast service provided by the roaming network and a multicast service provided by the home network. Therefore, upon receipt of a service announcement message, the UE 230 should be able to identify a network that provides a multicast service. For this purpose, the service announcement message may make a reference to a PLMN ID included in a multicast session ID or a PLMN ID included in a multicast group ID, or may include a PLMN ID identifying a network providing the service.

In operation 601a, the roaming UE 230 creates and selects an appropriate PDU session according to a PLMN that provides an intended multicast service. For example, in the absence of a PDU session for the PLMN providing the service and a corresponding DNN or S-NSSAI, the UE 230 may request PDU session establishment based on DNN information and S-NSSAI included in the service announcement message, whereas in the presence of the PDU session, the UE 230 transmits an MBS session join request by a PDU session modification request message in operation 601b.

Although the description is based on the assumption that the PDU session modification request is used in consideration of the assumption that the intended multicast service is provided by the home operator and the situation where the PDU session has already been crated for the DNN or the S-NSSAI, a PDU session establishment request message may also be used in a similar manner.

The MBS session join request message may include information such as the ID of the multicast service to join or the ID of a multicast session to join. The MBS session join request message may be included in a NAS SM message such as the PDU session establishment request message or the PDU session modification request message and transmitted to the serving SMF 293 through the AMF 250.

Upon receipt of the MBS session join request message included in the PDU session modification request message from the UE 230, the AMF 250 forwards the MBS session join request message to the V-SMF 530. In operation 602, the V-SMF 530 transmits the MBS session join request message to the H-SMF 570 by an Nsmf_PDUSession_update request (Joining request) message. When the H-SMF 570 does not have an MBS session context for the multicast session ID, the H-SMF 570 detects and selects the H-MB-SMF 580 that manages the multicast session ID. The H-SMF 570 transmits a multicast session join request message to the selected H-MB-SMF 580, to process the join request in operation 603. For example, the H-MB-SMF 580 modifies or obtains information for receiving multicast session traffic from the H-MB-UPF 591 as in operation 604, and transmits an MBS session context for the multicast session to the H-SMF 570 in response as in operation 605. The H-SMF 570 associates the multicast session ID with the PDU session based on the information for receiving multicast session traffic and stores the association.

The MBS session context may include information about an H-MB-SMF ID, QoS information, information about a group of UEs capable of receiving the multicast service, an MBS session ID, an MBS service ID, and so on.

In operation 606, the H-SMF 570 may modify the PDU session with the H-UPF 590 according to a received PDU session modification request. In operation 607, the H-SMF 570 transmits an Nsmf_PDUSession_update response message to the V-SMF 530 in response to the PDU session modification request. The Nsmf_PDUSession_update response message delivers information about the H-MB-SMF ID and information about the MBS session context together or as separate messages to the V-SMF 530.

In operations 608, 609, and 611, the V-SMF 530 transmits, to the UE 230, an MBS join ACK message together with a PDU session modification command message as a NAS SM message directed to the UE 230. The MBS join ACK message is included in the PDU session modification command message by the SMF, or the MBS join ACK message is included in the PDU session modification command message received from the H-SMF 570 by the V-SMF 530, for transmission to the UE 230.

In operation 608, the V-SMF 530 transmits the MBS session context including the H-MB-SMF ID, and PDU session information to the AMF 250. In operation 609, the V-SMF 530 transmits the MBS session context including the H-MB-SMF ID and the PDU session information to the RAN 240. Accordingly, the RAN 240 obtains the association between the multicast session and the PDU session.

When the RAN 240 does not support a shared tunnel or has to transmit data in the individual delivery method as in operation 610, the RAN 240 transmits an N2 session response message to the AMF 250, to request tunnel establishment in operation 612. The N2 session response message may include tunnel endpoint information for receiving multicast session traffic for the PDU session. The endpoint information includes the IP address of the RAN 240, and a tunnel ID.

In operation 613, upon receipt of the N2 session response message, the AMF 250 transmits tunnel information of the RAN 240 for individual delivery to the V-SMF 530. In operation 614, the V-SMF 530 may transmit the tunnel information of the RAN 240 together with the multicast session ID to the V-UPF 550, and obtain endpoint information about an individual tunnel for receiving multicast session traffic from the V-UPF 550. The endpoint information includes the ID address of the V-UPF 550 and a tunnel ID.

Further, because the V-SMF 530 has prior knowledge of the H-MB-SMF that services the multicast session ID, and the MBS session context, the V-SMF 530 transmits the multicast session ID, the endpoint information about the individual tunnel of the V-UPF 550, for receiving the multicast session traffic, and an indication requesting individual delivery to the H-MB-SMF 580. Further, in operation 620, the H-MB-SMF 580 transmits the received information about the individual tunnel together with the multicast session ID to the H-MB-UPF 591, so that the H-MB-UPF 591 may transmit multicast service traffic to the V-UPF 550 by individual delivery.

In operation 617, the V-UPF 550 transmits the multicast data traffic received from the content provider or the MBSTF eventually from the H-MB-UPF 591 to the RAN 240. In operation 618, the RAN 240 transmits the multicast session traffic received through the individual tunnel to the UE 230 in a point-to-multicast method or a point-to-point method.

According to an embodiment of the disclosure, instead of the individual delivery setup process of operation 615, the H-MB-SMF 580 may transmit the tunnel endpoint information of the V-UPF 550 together with the multicast session ID to the MBSF, and the MBSF may transmit the information to the MBSTF, so that the MBSTF may directly transmit multicast data traffic to the V-UPF 550.

According to an embodiment of the disclosure, the individual delivery setup process of operation 615 may be requested by forwarding the request to the H-SMF 570 by the V-SMF 530 and forwarding the request to the H-MB-SMF 580 by the H-SMF 570, rather than the V-SMF 530 makes a direct request to the H-MB-SMF 580.

According to various embodiments of the disclosure, when the UE 230 receives the multicast service provided by the home network, the V-SMF 530 of the local network may receive a join request message from the UE 230. When the UE 230 makes a wrong join request through a local routed PDU session, the V-SMF 530 may transmit a failure message for the join request to the UE 230 in response to the join request message. According to an embodiment, the failure message may include a failure cause. The failure cause may include DNN information and cause information indicating, for example, "multicast service not supported by home PLMN" or "non-supported multicast service". Upon receipt of the failure message, the UE 230 may identify that the UE 230 has selected a PDU session that does not match information included in a service announcement message. When the UE 230 selects another home routed PDU session and makes a join request, or when a suitable home routed PDU session is not created, the UE 230 may make a join request, creating a home routed PDU session.

Figure 7A:
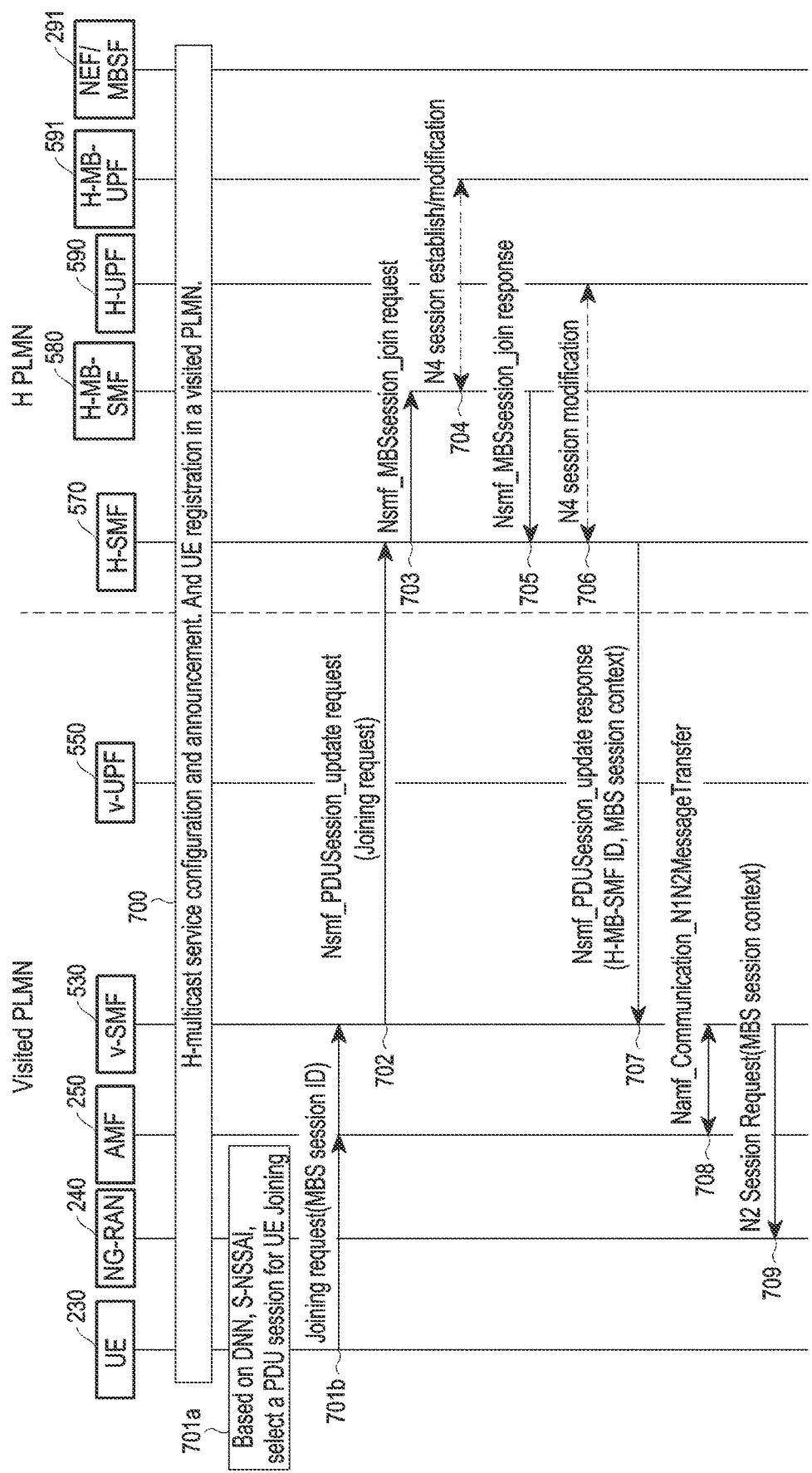
FIGS. 7A and 7B are diagrams illustrating signal flows for a procedure of providing a service in an individual delivery method, when a roaming UE joins a multicast service of a home operator according to various embodiments of the disclosure.
Figure 7B:
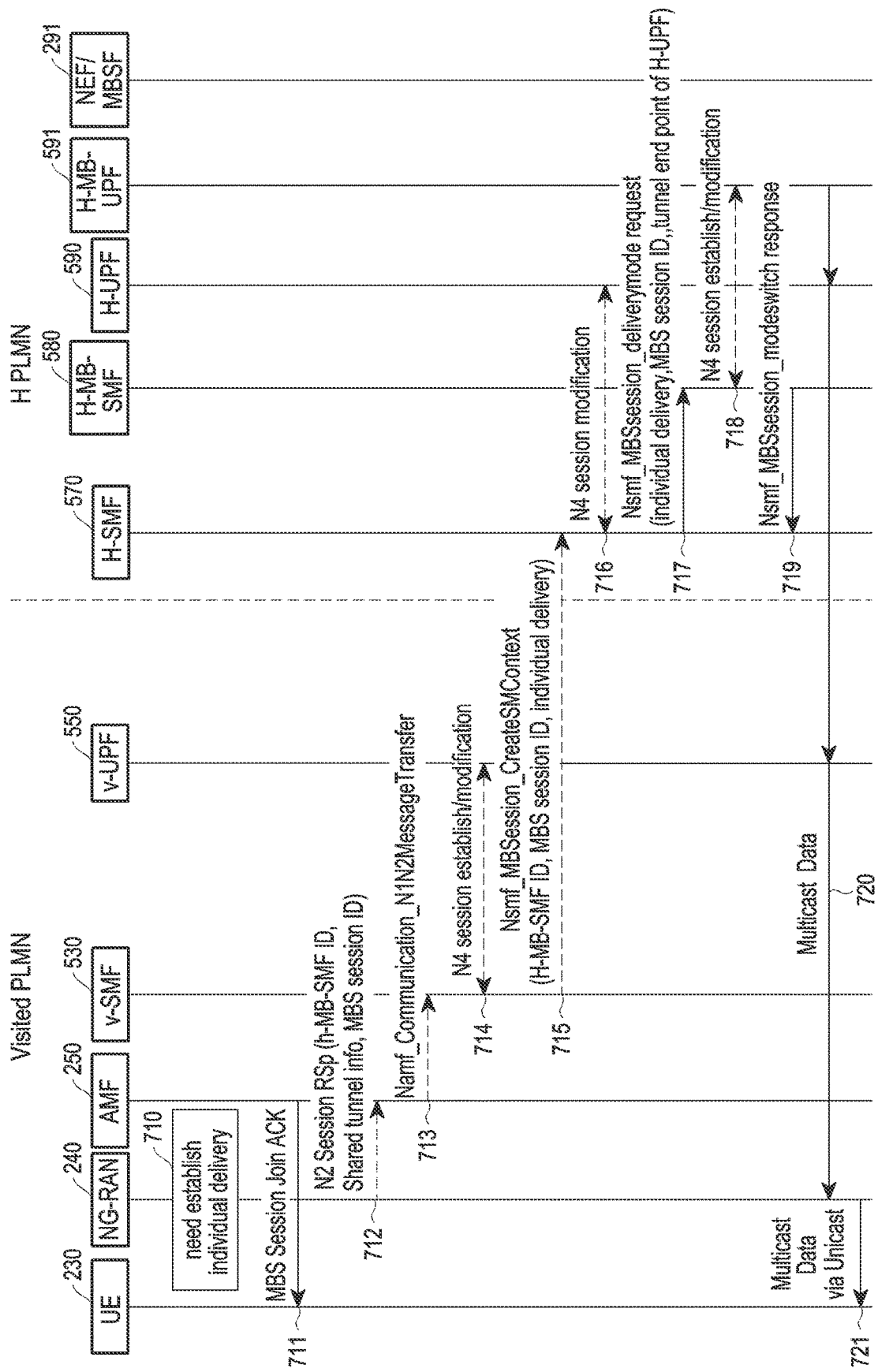

FIGS. 7A and 7B are diagrams illustrating signal flows for a procedure of providing a service in an individual delivery method, when a roaming UE joins a multicast service of a home operator according to various embodiments of the disclosure.

Referring to FIGS. 7A and 7B, in operation 700, in a situation where a multicast service is configured in the home PLMN of the UE 230 and a multicast service announcement is made for the multicast service, the UE 230 registers in the visited PLMN and determines to use the multicast service in operation 600, as described before with reference to other drawings. The UE 230, which has registered in a roaming network, may use a multicast service provided by the roaming network and a multicast service provided by the home network. Therefore, upon receipt of a service announcement message, the UE 230 should be able to identify a network that provides a multicast service. For this purpose, the service announcement message may make a reference to a PLMN ID included in a multicast session ID or a PLMN ID included in a multicast group ID, or may include a PLMN ID identifying a network providing the service.

In operation 701*a*, the roaming UE 230 creates and selects an appropriate PDU session according to a PLMN that provides an intended multicast service. For example, in the absence of a PDU session for the PLMN providing the service and a corresponding DNN or S-NSSAI, the UE 230 may request PDU session establishment based on DNN information and S-NSSAI included in the service announcement message, whereas in the presence of the PDU session, the UE 230 transmits an MBS session join request by a PDU session modification request message in operation 701*b*.

Although the description is based on the assumption that the PDU session modification request is used in consideration of the assumption that the intended multicast service is provided by the home operator and the situation where the PDU session has already been crated for the DNN or the S-NSSAI, a PDU session establishment request message may also be used in a similar manner.

The MBS session join request message may include information such as the ID of the multicast service to join or the ID of a multicast session to join. The MBS session join request message may be included in a NAS SM message such as the PDU session establishment request message or the PDU session modification request message and transmitted to the V-SMF 530 through the AMF 250.

Upon receipt of the MBS session join request message included in the PDU session modification request message from the UE 230, the AMF 250 forwards the MBS session join request message to the V-SMF 530. In operation 702, the V-SMF 530 transmits the MBS session join request message to the H-SMF 570 by an Nsmf_PDUSession_update request (Joining request) message. When the H-SMF 570 does not have an MBS session context for the multicast session ID, the H-SMF 570 detects and selects the H-MB-SMF 580 that manages the multicast session ID. The H-SMF 570 transmits a multicast session join request message to the selected H-MB-SMF 580, to process the join request as in operation 703. For example, the H-MB-SMF 580 modifies or obtains information for receiving multicast session traffic from the H-MB-UPF 591 as in operation 704, and transmits an MBS session context for the multicast session to the H-SMF 570 in response as in operation 705. The H-SMF 570 associates the multicast session ID with the PDU session and stores the association.

The MBS session context may include information about an H-MB-SMF ID, QoS information, information about a group of UEs capable of receiving the multicast service, an MBS session ID, an MBS service ID, and so on.

In operation 706, the H-SMF 570 may modify the PDU session with the H-UPF 590 according to a received PDU session modification request. In operation 707, the H-SMF 570 transmits an Nsmf_PDUSession_update response message to the V-SMF 530 in response to the PDU session modification request. The H-SMF 570 transmits information about the H-MB-SMF ID and information about the MBS session context together by Nsmf_PDUSession_update response message or as separate messages to the V-SMF 530. In operations 708, 709, and 711, the V-SMF 530 transmits, to the UE 230, an MBS join ACK message together with a PDU session modification command message as a NAS SM message directed to the UE 230. The MBS join ACK message is included in the PDU session modification command message by the SMF, or the MBS join ACK message is included in the PDU session modification command message received from the H-SMF 570 by the V-SMF 530, for transmission to the UE 230.

Specifically, in operation 708, the V-SMF 530 transmits the MBS session context including the H-MB-SMF ID, and PDU session information to the AMF 250. In operation 709, the V-SMF 530 transmits the MBS session context including the H-MB-SMF ID and the PDU session information to the RAN 240. Accordingly, the RAN 240 obtains the association between the multicast session and the PDU session.

When the RAN 240 does not support a shared tunnel or has to transmit data in the individual delivery method as in operation 710, the RAN 240 transmits an N2 session response message to the AMF 250, to request tunnel establishment in operation 712. The N2 session response message may include tunnel endpoint information for receiving multicast session traffic for the PDU session. The endpoint information includes the IP address of the RAN 240 and a tunnel ID.

In operation 713, upon receipt of the N2 session response message, the AMF 250 transmits tunnel information of the RAN 240 for individual delivery to the V-SMF 530. In operation 714, the V-SMF 530 may transmit the tunnel information of the RAN 240 together with the multicast session ID to the V-UPF 550, and obtain endpoint information about an individual tunnel for receiving multicast session traffic from the V-UPF 550. The endpoint information includes the ID address of the V-UPF 550 and a tunnel ID.

In operation 715, the V-SMF 530 transmits the multicast session ID, the endpoint information about the individual tunnel of the V-UPF 550, for receiving the multicast session traffic, and an indication requesting individual delivery to the H-SMF 570 by an Nsmf_MBSession_CreateSMContext request or Nsmf_MBSession_UpdateSMContext request message. In operation 716, the H-SMF 570 transmits the received information about the individual tunnel together with the multicast session ID to the H-UPF 590, to set tunnel information for transmitting multicast service traffic to the V-UPF 550 through individual delivery by the H-UPF 590. Further, the H-SMF 570 may obtain endpoint information about an individual tunnel of the H-UPF 590, for receiving multicast session traffic from the H-MB-UPF 591. In operation 717, the H-SMF 570 may transmit a message requesting individual delivery setup to the H-MB-SMF 580. The request message may include an indication requesting individual delivery setup, the multicast session ID, and tunnel information for individual delivery of the H-UPF 590. The tunnel information for individual delivery of the H-UPF 590 includes information about the address of the H-UPF 590 and a tunnel ID.

In operation 718, upon receipt of the request message, the H-MB-SMF 580 transmits the multicast session ID and endpoint information about the individual tunnel of the H-UPF 590 to the H-MB-UPF 591 in order to establish the tunnel for individual delivery. In operation 719, the H-MB-SMF 580 may notify the H-SMF 570 of the result of the individual tunnel setup.

Therefore, in operation 720, multicast data traffic received from the content provider or the MBSTF is transmitted eventually from the H-MB-UPF 591 to the RAN 240 through the H-UPF 590 and the V-UPF 550. In operation 721, the RAN 240 transmits the multicast session traffic received through the individual tunnel to the UE 230 in a point-to-multicast method or a point-to-point method.

According to an embodiment of the disclosure, instead of the individual delivery setup process of operations 715 and 716, the H-SMF 570 may transmit the tunnel endpoint information of the H-UPF 590 together with the multicast session ID to the MBSF, and the MBSF may transmit the information to the MBSTF, so that the MBSTF may directly transmit multicast data traffic to the H-UPF 590.

According to an embodiment of the disclosure, instead of the request of the individual delivery setup process of operations 717 and 718, the H-SMF 570 may transmit the tunnel endpoint information of the H-UPF 590 together with the multicast session ID to the MBSF through the H-MB-SMF 580, and the MBSF may transmit the information to the MBSTF, so that the MBSTF may directly transmit multicast data traffic to the H-UPF 590.

According to various embodiments of the disclosure, when the UE 230 receives the multicast service provided by the home network, the V-SMF 530 of the local network may receive a join request message from the UE 230. When the UE 230 makes a wrong join request through a local routed PDU session, the V-SMF 530 may transmit a failure message for the join request to the UE 230 in response to the join request message. According to an embodiment, the failure message may include a failure cause. The failure cause may include DNN information and cause information indicating, for example, "multicast service not supported by home PLMN" or "non-supported multicast service". Upon receipt of the failure message, the UE 230 may identify that the UE 230 has selected a PDU session that does not match information included in a service announcement message. When the UE 230 selects another home routed PDU session and makes a join request, or when a suitable home routed PDU session is not created, the UE 230 may make a join request, creating a home routed PDU session.

Figure 8:
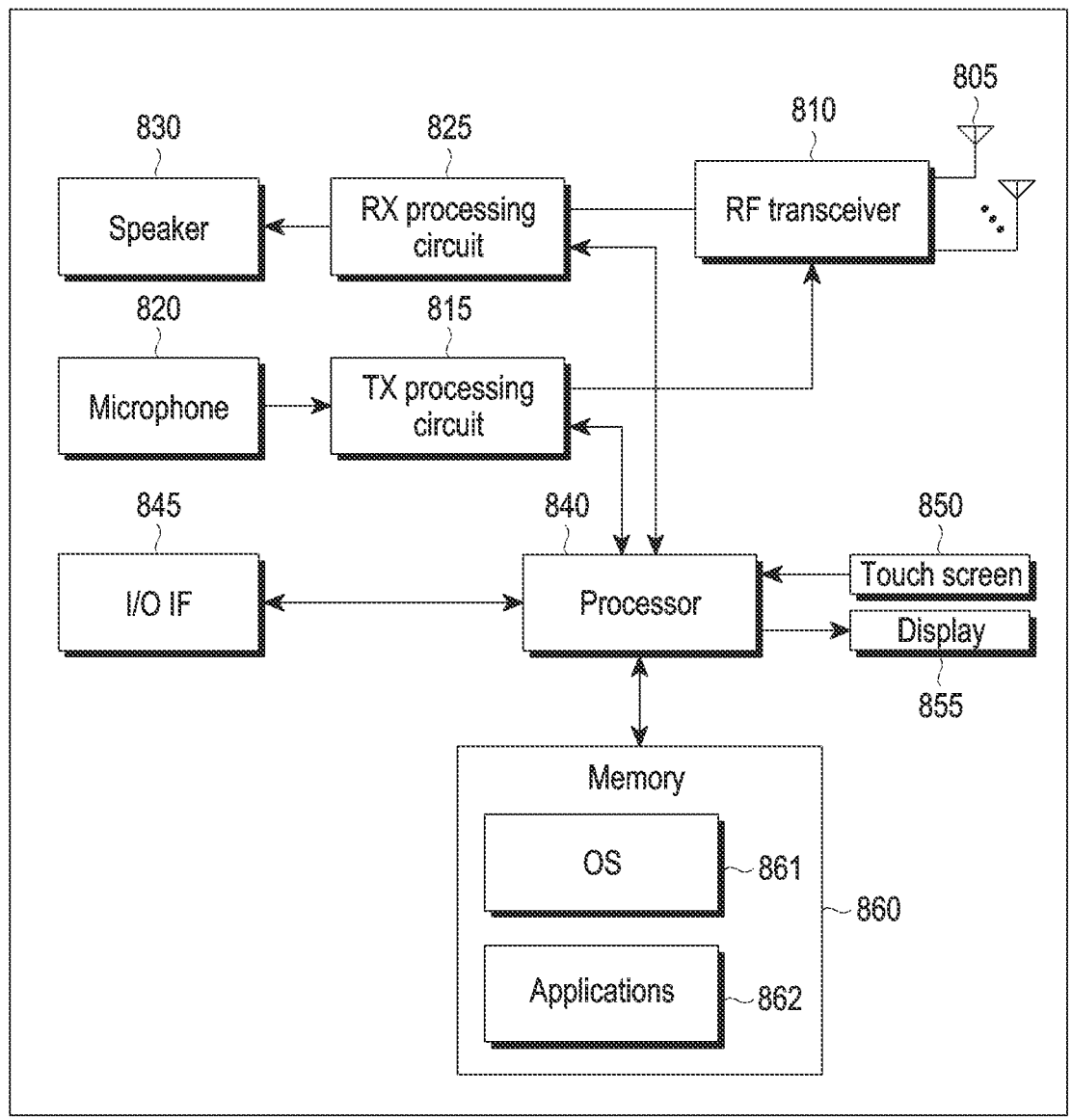
FIG. 8 is a block diagram illustrating an internal structure of a UE in a wireless communication system according to an embodiment of the disclosure.

FIG. 8 is a block diagram illustrating a UE in a wireless communication system according to an embodiment of the disclosure.

The embodiment of the UE illustrated in FIG. 8 is merely an example, and thus FIG. 8 does not limit the scope of the disclosure to any specific implementation of the UE.

Referring to FIG. 8, the UE includes an antenna 805, a radio frequency (RF) transceiver 810, a transmission (TX) processing circuit 815, a microphone 820, and a reception (RX) processing circuit 825. The UE further includes a speaker 830, a processor 840, an input/output (I/O) interface (IF) 845, a touch screen 850, a display 855, and a memory 860. The memory 860 includes an operating system (OS) 861 and one or more applications 862.

The RF transceiver 810 receives an RF signal from a BS in a network through the antenna 805. The RF transceiver 810 downconverts the received RF signal to an intermediate frequency (IF) signal or a baseband signal. The RX processing circuit 825 filters, decodes, and/or digitizes the baseband or IF signal received from the RF transceiver 810 to generate a processed baseband signal. The RX processing circuit 825 transmits the processed baseband signal to the speaker 830 (e.g., for voice data) or the processor 840 (e.g., for web browsing data), for additional processing.

The TX processing circuit 815 receives analog or digital voice data from the microphone 820 or receives other output baseband data (such as web data, e-mail, or interactive video game data) from the processor 840. The TX processing circuit 815 encodes, multiplexes, and/or digitizes output baseband data to generate a baseband or IF signal. The RF transceiver 810 up-converts the processed baseband or IF signal received from the TX processing circuit 815 to an RF signal to be transmitted through the antenna 805.

The processor 840 may include at least one processor or other processing devices, and may execute the OS 861 stored in the memory 860 to provide overall control to the UE. For example, the processor 840 may control reception of a DL channel signal and transmission of a UL channel signal by the RF transceiver 810, the RX processing circuit 825, and the TX processing circuit 815 according to known principles. In some embodiments, the processor 840 includes at least one microprocessor or microcontroller.

In various embodiments of the disclosure, the processor 840 provides overall control to operations related to a method of providing a multicast service in a 5G network system providing a multicast/broadcast service. That is, the processor 840 controls overall operations related to the method of providing a multicast service in a 5G network system providing a multicast/broadcast service as described before with reference to FIGS. 1A, 1B, 2A, 2B, 3, 4A, 4B, 5A, 5B, 6A, 6B, 7A, and 7B.

The processor 840 may move data into the memory 860 or from the memory 860, when required by an on-going process. In some embodiments, the processor 840 is configured to execute the applications 862 based on OS program 861 or in response to signals received from BSs or an operator. In addition, the processor 840 is coupled to the I/O interface 845, and the I/O interface 845 provides the UE with connectivity to other devices such as laptop computers and handheld computers. The I/O interface 845 is a communication path between these accessories and the processor 840.

The processor 840 is also coupled to the touch screen 850 and the display 855. The operator of the UE may input data to the UE by using the touch screen 850. The display 855 may be a liquid crystal display (LCD), a light emitting diode (LED) display, or other displays capable of rendering text and/or at least limited graphics, such as from websites.

The memory 860 is coupled to the processor 840. A part of the memory 860 may include random access memory (RAM), and the remaining part of the memory 860 may include flash memory or other read-only memory (ROM).

Although FIG. 8 illustrates an example of a UE, various modifications may be made to FIG. 8. For example, various components illustrated FIG. 8 may be combined, further divided, or omitted, and other components may be added according to special needs. Further, in a particular example, the processor 840 may be divided into one or more central processing units (CPUs) and a number of processors such as one or more graphics processing units (GPU). Further, even though the UE is configured as a mobile phone or a smart phone in FIG. 8, the UE may be configured to operate as any other type of mobile or fixed device.

Figure 9:
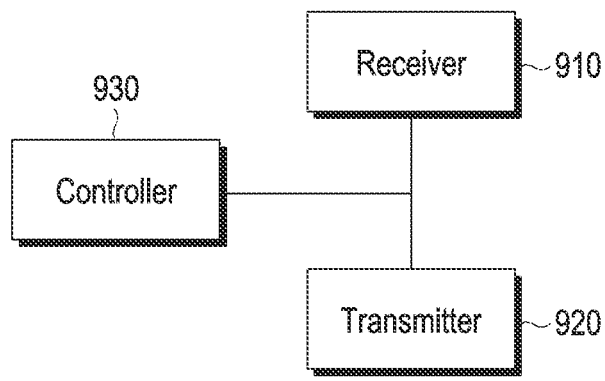
FIG. 9 is a block diagram illustrating the internal structures of an access and mobility management function (AMF), an SMF, and a user plane function (UPF) according to an embodiment of the disclosure.

FIG. 9 is a block diagram illustrating an internal structure of an AMF, an SMF, and a UPF according to an embodiment of the disclosure.

Referring to FIG. 9, an AMF, SMF, and UPF 900 include a receiver 910, a transmitter 920, and a controller 930. In addition, the AMF, SMF, and UPF 900 may be implemented to include a communication interface and a processor for communication with other network entity(s) in a core network of the 5G system. In addition, the AMF, SMF, and UPF 900 may be implemented by including functions of the AMF, SMF, and UPF 900 in a server.

The controller 930 provides overall control to the AMF, SMF, and UPF 900, particularly operations related to multi-broadcasting. Since the controller 930 controls the AMF, SMF and UPF in the same manner as described before with reference to FIGS. 1A, 1B, 2A, 2B, 3, 4A, 4B, 5A, 5B, 6A, 6B, 7A, and 7B, a detailed description of the control operation will be avoided herein.

The receiver 910 receives various messages, information, and so on under the control of the controller 930.

The transmitter 920 transmits various messages, information, and so on under the control of the controller 930.

While the receiver 910, the transmitter 920, and the controller 930 are shown in FIG. 9 as configured as separate units, at least two of the receiver 910, the transmitter 920, and the controller 930 may be integrated into one unit. In addition, the receiver 910, the transmitter 920, and the controller 930 may be implemented as at least one processor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
receiving a service announcement including a public land mobile network (PLMN) identifier (ID);
in case that there is an existing protocol data unit (PDU) session, transmitting, to a network entity, a PDU session modification request message containing a join request for a multicast/broadcast service (MBS) session; and
in case that there is no PDU session established with a data network name (DNN) and a single-network slice selection assistance information (S-NSSAI) for the MBS session, transmitting, to a network entity, a PDU session establishment request message for a PDU session containing the join request.

2. The method of claim 1, wherein the service announcement further comprises an MBS session ID, the DNN, and the S-NSSAI.

3. The method of claim 1, wherein the PDU session modification request message or the PDU session establishment request message further comprises an MBS session ID.

4. The method of claim 1, further comprising:
receiving a PDU session modification command message in response to the PDU session modification request message.

5. The method of claim 1,
wherein the network entity is an access management function (AMF).

6. The method of claim 1, wherein MBS session data is received using point to point (PTP) or point to multicast (PTM) transmission.

7. A user equipment (UE) in a wireless communication system, the UE comprising:
a transceiver; and
a processor coupled with the transceiver and configured to:
receive a service announcement including a public land mobile network (PLMN) identifier (ID),
in case that there is an existing protocol data unit (PDU) session, transmit a PDU session modification request message containing a join request for a multicast/broadcast service (MBS) session to a network entity, and
in case that there is no PDU session established with a data network name (DNN) and a single-network slice selection assistance information (S-NSSAI) for the MBS session, transmit a PDU session establishment request message for a PDU session containing the join request to a network entity.

8. The UE of claim 7, wherein the service announcement further comprises an MBS session ID, the DNN, and the S-NSSAI.

9. The UE of claim 7, wherein the PDU session modification request message or the PDU session establishment request message further comprises an MBS session ID.

10. The UE of claim 7, wherein the processor is further configured to:
   receive a PDU session modification command message in response to the PDU session modification request message.

11. The UE of claim 7,
   wherein the network entity is an access management function (AMF).

12. The UE of claim 7, wherein MBS session data is received using point to point (PTP) or point to multicast (PTM) transmission.

* * * * *